United States Patent [19]

Takakura et al.

[11] Patent Number: 5,752,053
[45] Date of Patent: May 12, 1998

[54] DOCUMENT PROCESSING APPARATUS FOR PROCESSING A DOCUMENT AND ASSOCIATED FORMAT INFORMATION

[75] Inventors: Hiroshi Takakura, Yokohama; Satoshi Ishihara, Sagamihara; Keiko Yasuda, Fuchu, all of Japan

[73] Assignee: Canon Kabushiki Kaisha, Tokyo, Japan

[21] Appl. No.: 444,359

[22] Filed: May 18, 1995

Related U.S. Application Data

[60] Continuation of Ser. No. 878, Jan. 5, 1993, abandoned, which is a division of Ser. No. 782,767, Oct. 22, 1991, Pat. No. 5,208,905, which is a continuation of Ser. No. 270,647, Nov. 14, 1988, abandoned.

[30] Foreign Application Priority Data

| Nov. 16, 1987 | [JP] | Japan | 62-289141 |
| Nov. 16, 1987 | [JP] | Japan | 62-289142 |
| Nov. 16, 1987 | [JP] | Japan | 62-289143 |

[51] Int. Cl.⁶ ............................. G06T 1/00
[52] U.S. Cl. ............................. 395/766; 395/352
[58] Field of Search .................. 395/144–149, 395/159, 115–116, 156, 766–769, 779–787, 788, 793, 352

[56] References Cited

U.S. PATENT DOCUMENTS

| 4,314,357 | 2/1982 | Kimura et al. | 395/148 |
| 4,555,773 | 11/1985 | Karnes, Jr. et al. | 395/147 |
| 4,575,813 | 3/1986 | Bartlett et al. | |
| 4,587,631 | 5/1986 | Nielsen et al. | |
| 4,649,513 | 3/1987 | Martin et al. | 395/149 |
| 4,663,731 | 5/1987 | Ikegami et al. | |
| 4,755,955 | 7/1988 | Kimura et al. | |
| 4,802,104 | 1/1989 | Ogiso . | |
| 4,807,142 | 2/1989 | Agarwal . | |
| 4,823,303 | 4/1989 | Terasawa . | |
| 4,829,294 | 5/1989 | Iwami et al. | |
| 5,018,083 | 5/1991 | Watanabe et al. | |
| 5,109,487 | 4/1992 | Ohgomori et al. | 395/200.14 |

FOREIGN PATENT DOCUMENTS

| 0225191 | 6/1987 | European Pat. Off. . |
| 0245041 | 11/1987 | European Pat. Off. . |

OTHER PUBLICATIONS

*Microsoft Windows Write User's Guide*, 1987, p. 58.

*Primary Examiner*—Almis R. Jankus
*Assistant Examiner*—Joseph H. Field
*Attorney, Agent, or Firm*—Fitzpatrick, Cella, Harper & Scinto

[57] ABSTRACT

A document processing apparatus which can edit to a sheet which is displayed on a display screen. This apparatus includes a format setting device to set format information regarding a character editing, a size information deciding device to decide size information in which an interval corresponding to the format information is used as a unit; a figure input device to input a figure on the same display screen as that upon the character editing; and a display controller for controlling the display such that the figure input by the figure input device is displayed in accordance with the size information decided by the size information deciding device. The size information includes a point train called grids serving as reference marks when inputting a figure. With this apparatus, characters, a figure, a picture, and a form can be input and edited to arbitrary positions on a document while observing the state of the print bound document without newly designating an area. One integrated document consisting of a plurality of pages in which characters, figures, pictures, and forms mixedly exist can be output by a single output instruction.

8 Claims, 35 Drawing Sheets

19 CHARACTER IMAGE

ゲレンデガイド

●●とくとく情報●●
貸スキーセットがお得！
1 スキー板
2 ストック　　1日
3 スキー靴　　2000円
[お問合せ]
㈱　□□□□レジャー
☎　▼▼▼－○○－X

△△△での一番人気は第3ロマンスリフトぞいのパノラマゲレンデ。

最大22度、平均12度、完全整備で見通しのいい一枚バーンは滑って気持がよく、スタート直後にさえ気をつければビギナーでも大丈夫。

上級者は最大29度のカベが売物の上級者ゲレンデに集中する。

コース幅はたっぷりだがコブが激しく距離の短さを補っている。

また、白樺コースはロマンチックに林間を楽しめる。

リフトから離れた東側は、斜度がちょっときつくなるため中級者向け。全体的にゆるやかで広い斜面のため、初心者でもリフトを利用してレッスンに励めるのがこのスキー場の利点といえる。

20 FIGURE IMAGE

21 PICTURE IMAGE

交通情報

マイカー　◇◇◇自動車道
XXXICからRⓇを△△バイパス経由□□交差点を右折し、県道6.6km○○ICからは45km。

22 FORM IMAGE

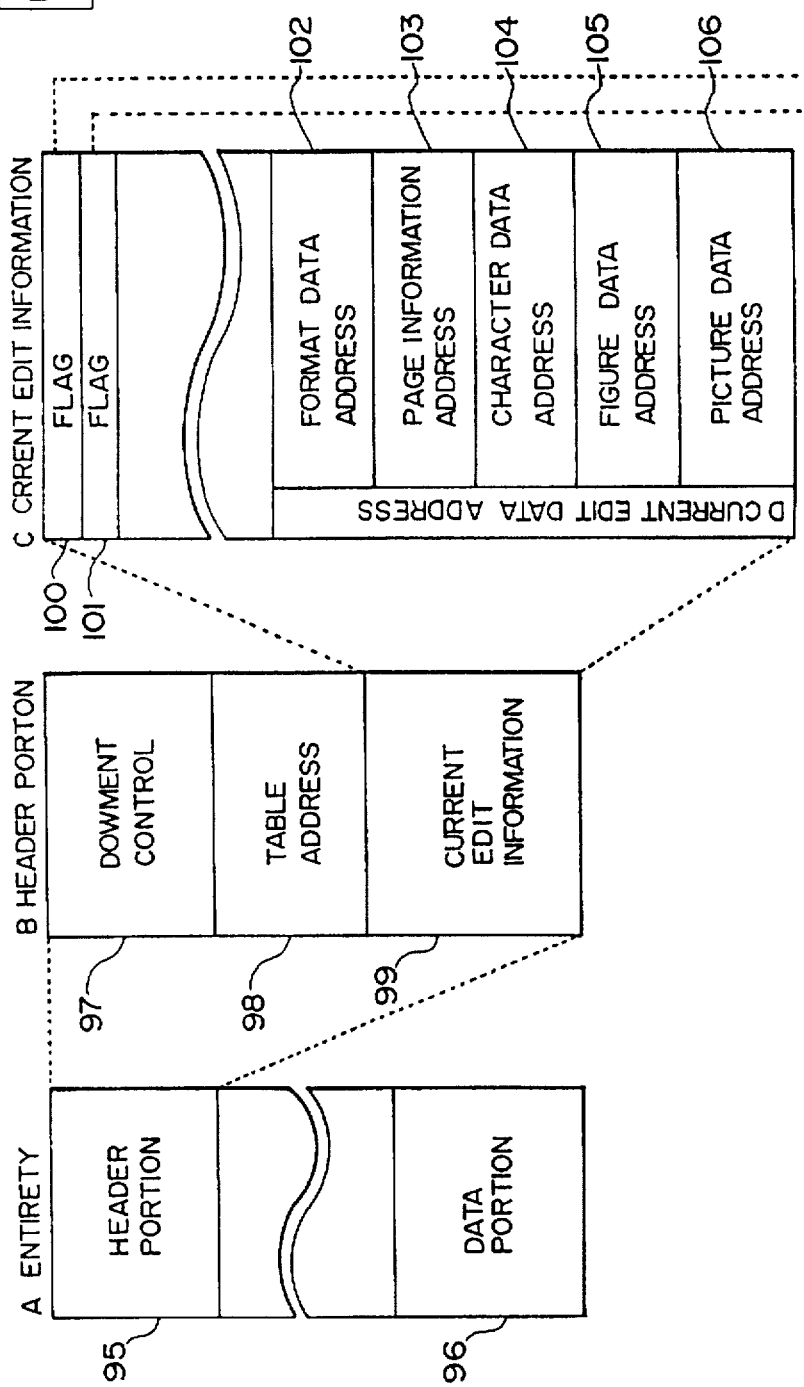

DOCUMENT PROCESSING APPARATUS FOR PROCESSING A DOCUMENT AND ASSOCIATED FORMAT INFORMATION

This application is a continuation, of application Ser. No. 08/000,878 filed Jan. 5, 1993, now abandoned, which is a divisional of Ser. No. 07/782,767, filed Oct. 22, 1991, U.S. Pat. No. 5,208,705, May 4, 1993, which is a continuation of Ser. No. 07/270,647, filed Nov. 14, 1988, now abandoned.

BACKGROUND OF THE INVENTION

1. Field of the Invention

The present invention relates to a document processing apparatus which has a print binding function and can perform character editing, figure editing, and picture editing.

2. Related Background Art

Hitherto, in word processors, when pictures or figures are input and edited, the character editing is once interrupted, a display screen is changed, and pictures are input, or the display screen is further changed and figures are input, so that the operations are very complicated. Therefore, when a picture or a figure is pasted beside sentences, an empty space surrounded by a frame is first formed during the formation of sentences and the display screen must be switched every time, so that the switching operations are complex and it is very hard to efficiently use the apparatus.

On the other hand, in the case of displaying both characters and figures or both characters and pictures on the same display screen as mentioned above, for instance, the figure or picture can be input to the inside of the frame which has previously formed. Even so, it is difficult to edit both of characters and a figure or both characters and a picture so that they overlap.

Consequently, it is entirely impossible to simultaneously display both of characters and a figure, and further, a picture or form data as a background for the characters and the figure into the same region by simple operations. There are practically a number of printed documents as shown in, e.g., FIG. 2B. However, such printed matters cannot be easily created by an ordinary word processor. Presently, that the making of such pamphlets, brochures, leaflets, etc. is contracted out to a special printing company or the like.

Document processing apparatus can be directed to input and edit in a realtime manner while displaying the result of a printing on the display screen {such a process is called WYSIWYG (What You See Is What You Get)}. However, such complicated printed matters represented by those pamphlets, brochures, leaflets, etc. cannot be practically obtained while inputting and editing in a realtime manner.

As mentioned above, hitherto, since characters, figures, and images are individually processed, a proper matching among those various kinds of data cannot be derived.

Grids (dimension information) will now be described. When creating or editing characters and figures, grid measures (scale such as a measuring rule) indicative of dimension information are respectively is played as a supporting function to determine the position and size in different areas of the characters and figures (no measure is obviously displayed in the character creating area). That is, the dimension information is substantially independently defined for characters and figures. Therefore, the dimension information cannot be displayed in consideration of the relation between the characters and the figures.

A format will now be explained. Since the definition of a format of a document is conventionally effective for the whole document, even in the case of a document of a plurality of pages, when the format is once determined, this format is applied until the last page. Therefore, in the case of creating a document of a plurality of pages, the front cover (the first page) and the back front cover are first created on the basis of predetermined formats and are printed. Thereafter, a format suitable for the pages between the front and back covers is set and these pages are created and printed in accordance with this format. However, in this case, the printing operation must be performed twice. Further, much effort is needed to adjust the page numbers.

A form image 22 shown in FIG. 2C which is used as an image to be displayed on a plurality of pages will now be described. Hitherto, when a form image is created and displayed during the character input editing, the creating and editing of both of the characters and figures cannot be performed in the same area. Therefore, in the case of first creating the form image as a figure image, another area is newly defined out of the character input editing area which is at present being edited and, thereafter, the form image is created. FIG. 11 is a flowchart showing a conventional operating procedure in which the forms as mentioned above are registered and displayed on a page which is being edited. This procedure will be described hereinbelow.

First, when the operator starts the form registration, an area to create a form is defined in step 11-1 and figure data as form data is created in step 11-2. The created figure data is registered as a form in step 11-3. After completion of the form registration, the document editing is started in step 11-4. When the form registered in step 11-3 is changed or designated by the form designation during the form defining operation in step 11-5, the form is displayed on the display screen. In accordance with this procedure, the registered form is displayed.

When the created form image is once set to the document, this form image is set as a background of the document until the last page. Further, it can be designated from only the odd (first) page. Consequently, the conventional apparatus cannot satisfy a requirement to set a form image from the even page and cannot set a plurality of form images.

SUMMARY OF THE INVENTION

In consideration of the foregoing points, it is an object of the present invention to provide a document processing apparatus in which a figure, a picture, and a form can be input and edited to arbitrary positions on sentences while observing a state of print binded sentences without newly designating other areas.

Another object of the invention is to provide a document processing apparatus in which by setting the priorities on the display, the arrangement state with the other images can be checked irrespective of the inputting order or the kind of image which is being input.

Still another object of the invention is to provide a document processing apparatus in which since the foregoing data can be independently managed, even in the case where only desired data is not displayed or where data is mixed in a complicated manner, they can be displayed at a high speed.

In consideration of the foregoing points, still another object of the invention is to provide a document processing apparatus in which a format can be changed on a page unit basis and one integrated document consisting of a plurality of pages can be output by a single output instruction.

In consideration of the foregoing points, still another object of the invention is to provide a document processing apparatus in which a figure can be input and edited to an arbitrary position while observing a state of the print binded sentences without newly designating an area (frame), and the dimension information as a reference to input the figure can be displayed in accordance with a format to thereby enable easy matching with the state of the sentences.

In consideration of the foregoing points, still another object of the invention is to provide a document processing apparatus in which a figure can be also input even during the character inputting editing and this figure can be registered as a form so as to be displayed on a plurality of desired pages.

Still another object of the invention is to provide a document processing apparatus which has a plurality of form images and in which the form image can be also changed on a page unit basis in association with a change of format of the page unit, and the integrated document of a plurality of pages consisting of characters, pictures, figures, and forms can be output by a single output instruction.

BRIEF DESCRIPTION OF THE DRAWINGS

FIGS. 3A to 3E shows diagrams of input edit screens, in which FIGS. 3A to 3C are diagrams showing input edit menues which are displayed in the lower portion of the screen, FIG. 3D is a diagram showing that the display contents of the main menu and grids are changed due to a change in kind of the input edit, and FIG. 3E is a diagram showing a state after the non-display of a character image was instructed during the figure input editing;

FIGS. 6A to 6G show diagrams of sub-menues and documents which are being created which are displayed on the screen when the document as shown in FIGS. 2A–2C is created, in which FIGS. 6A to 6D are diagrams showing examples of sub-menues for grid definition and documents in which the defined grids are displayed, FIGS. 6E and 6F are diagrams of a form library showing a registered form and a sub-menu to designate a form and FIG. 6G shows a special state of the document shown in FIG. 2C;

FIGS. 7A, 7A-1, 7A-2, 7B, 7B-1 and 7B-2 are diagrams showing data structures of the invention;

FIGS. 9A, 9A-1, 9A-2, 9B, and 9C show diagrams regarding the irregular format definition (including a change in form), in which FIGS. 9A, 9A-1, and 9A-2 are diagrams showing the processes of data during the definition of "irregular format", FIGS. 9B and C are diagrams showing the internal processes which are executed when the inserting process is actually designated after the irregular format was defined.

DETAILED DESCRIPTION OF PREFERRED EMBODIMENTS

An embodiment suitable for the present invention will be described in detail hereinbelow with reference to the drawings. A document processing apparatus in this invention may be obviously constructed by any one of: a system consisting of various kinds of apparatuses, a sole apparatus, and a system consisting of a network.

Prior to describing the embodiment in detail, the fundamental concepts of the invention will be first explained.

1) The term "document edit" used in the description of the present invention includes not only character input editing but also the figure input editing and picture input editing. A display pattern called a form is added to these three input editing operations and a total four kinds of display patterns are provided.

The term "form" denotes a display pattern which is frequently overlappingly used as a background of a document. After a figure image created by figure input editing has once been registered as a form image, it can be conveniently used many times as a background of a document.

2) Those four kinds of display patterns are hereinafter called a character image, a figure image, a picture image, and a form image and an explanation of these patterns will be provided below. These four kinds of images will be first described with respect to a their creating procedures, which are different. In addition, it will be explained; and that those patterns can be displayed in the same area on a display screen although they are different images (display patterns).

3) In the following explanation, the term "instruction by an operator" is used. Although omitted in the subsequent description, an instruction by an operator is performed by a pointing device 9 or a key input from a keyboard 8 shown in FIG. 1. Thirteen diagrams are used to easily explain the invention. These diagrams will now be briefly explained one by one, hereinbelow.

SYSTEM BLOCK DIAGRAM

Figure 1:
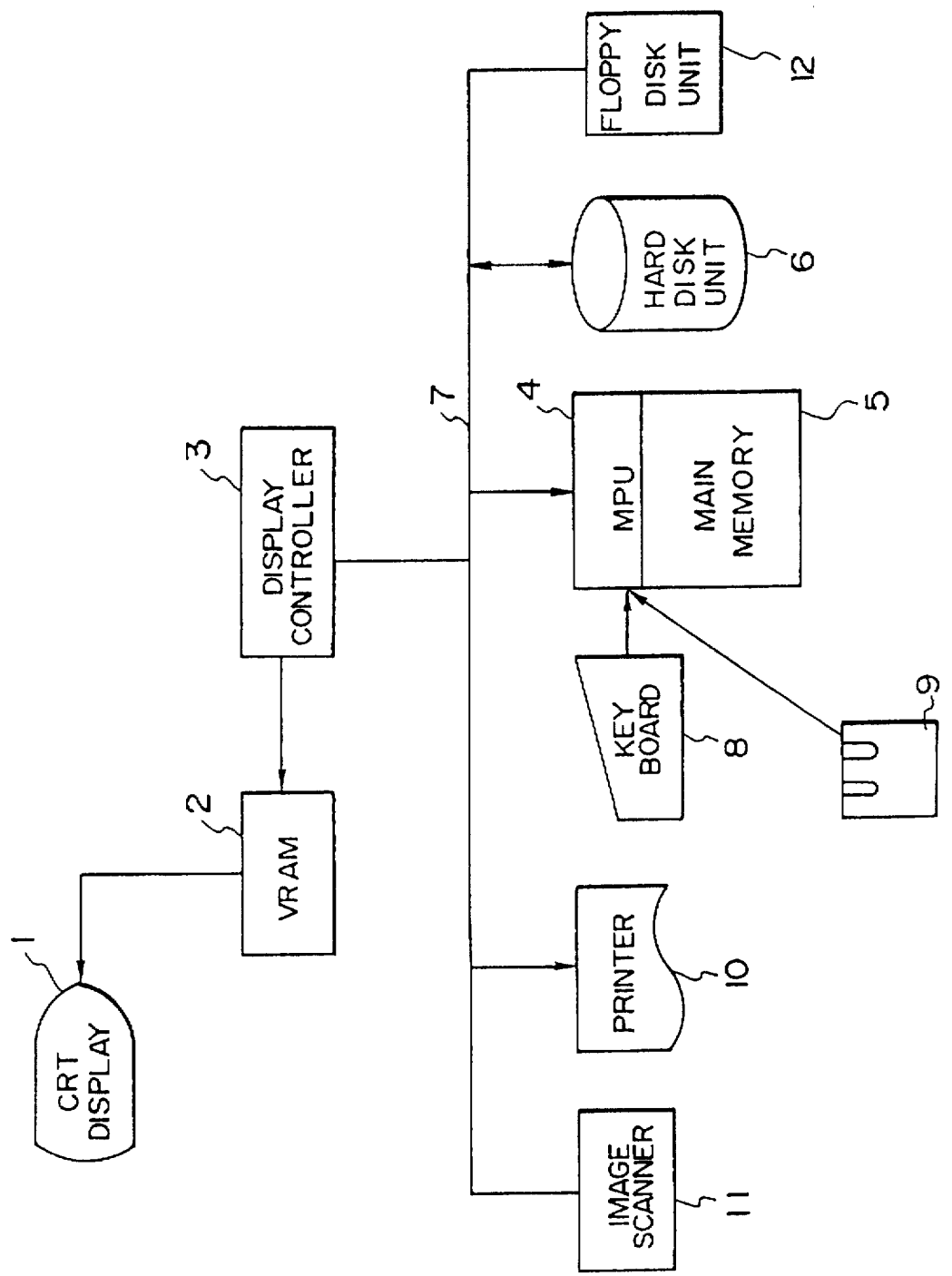
FIG. 1 is a system block diagram of a document processing apparatus of an embodiment according to the present invention.

FIG. 1 is a system block diagram of a document processing apparatus of an embodiment according to the invention. In the diagram, reference numeral 1 denotes a CRT display which is used in a raster scan display system; 2 indicates a video RAM (VRAM) to store display pattern information of one display screen; 3 is a display controller to control the writing operation of pattern information into the VRAM 2 and the reading operation to the CRT display; 5 denotes a main memory having areas to store control programs shown in FIGS. 7A, 7A-1, 7A-2, 7B, 7B-1, and 7B-2 and document data; and 4 denotes a microprocessor (MPU) to perform the main control of the apparatus. A keyboard 8 inputs character data or the like and the pointing device (PD) 9 to designates a position on the CRT to perform the input editing or the like of figure data. Keyboard 8 and pointing device 9 are connected to the MPU 4. Reference numeral 6 denotes a hard disk unit into which document files and character fonts are stored; 10 indicates a printer to output a created document; 11 denotes an image scanner to read an image such as picture or the like; and 12 denotes a floppy disk unit to perform the preservation or the like of document files or the like. These component blocks are connected by an I/O bus 7.

EXAMPLES OF DOCUMENTS

Figure 2A:
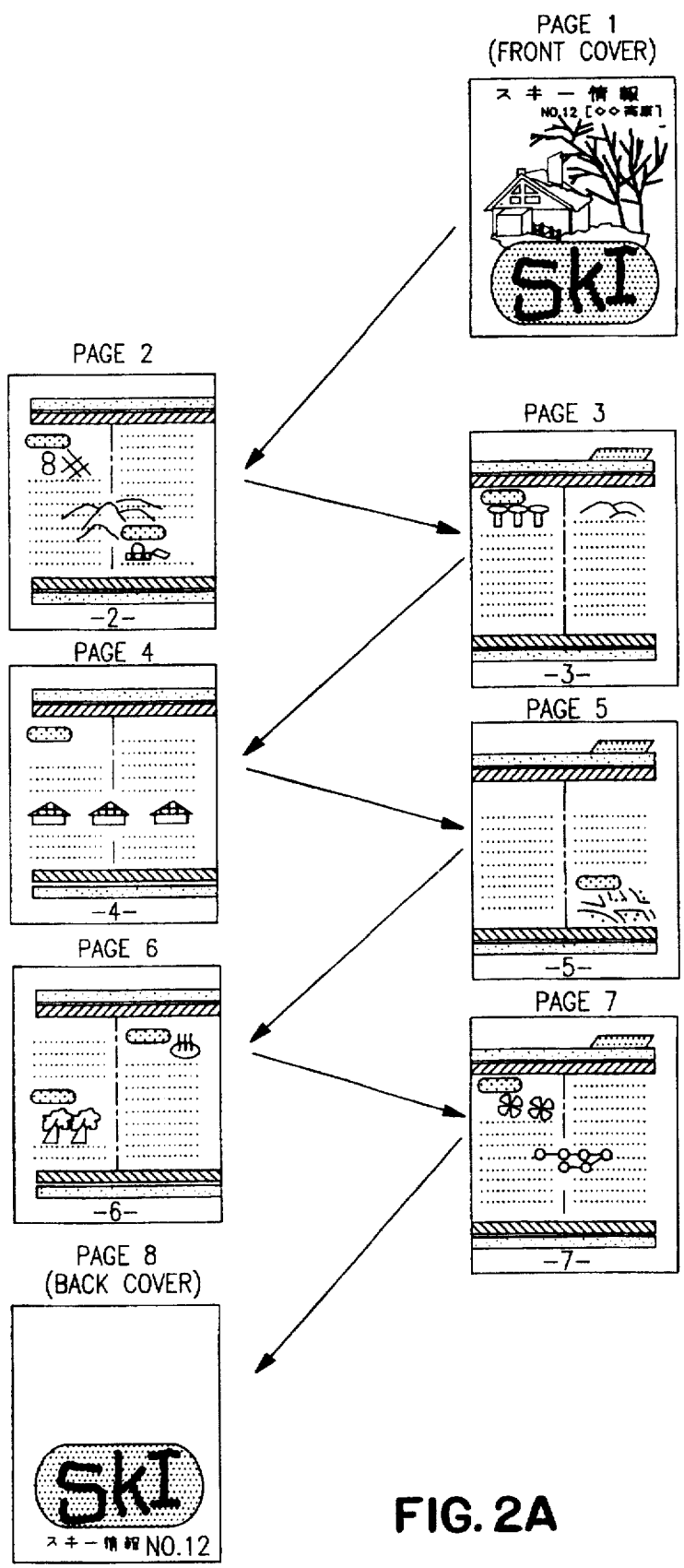
FIGS. 2A to 2-L show diagrams of examples documents which can be created by the invention.
Figure 2B:
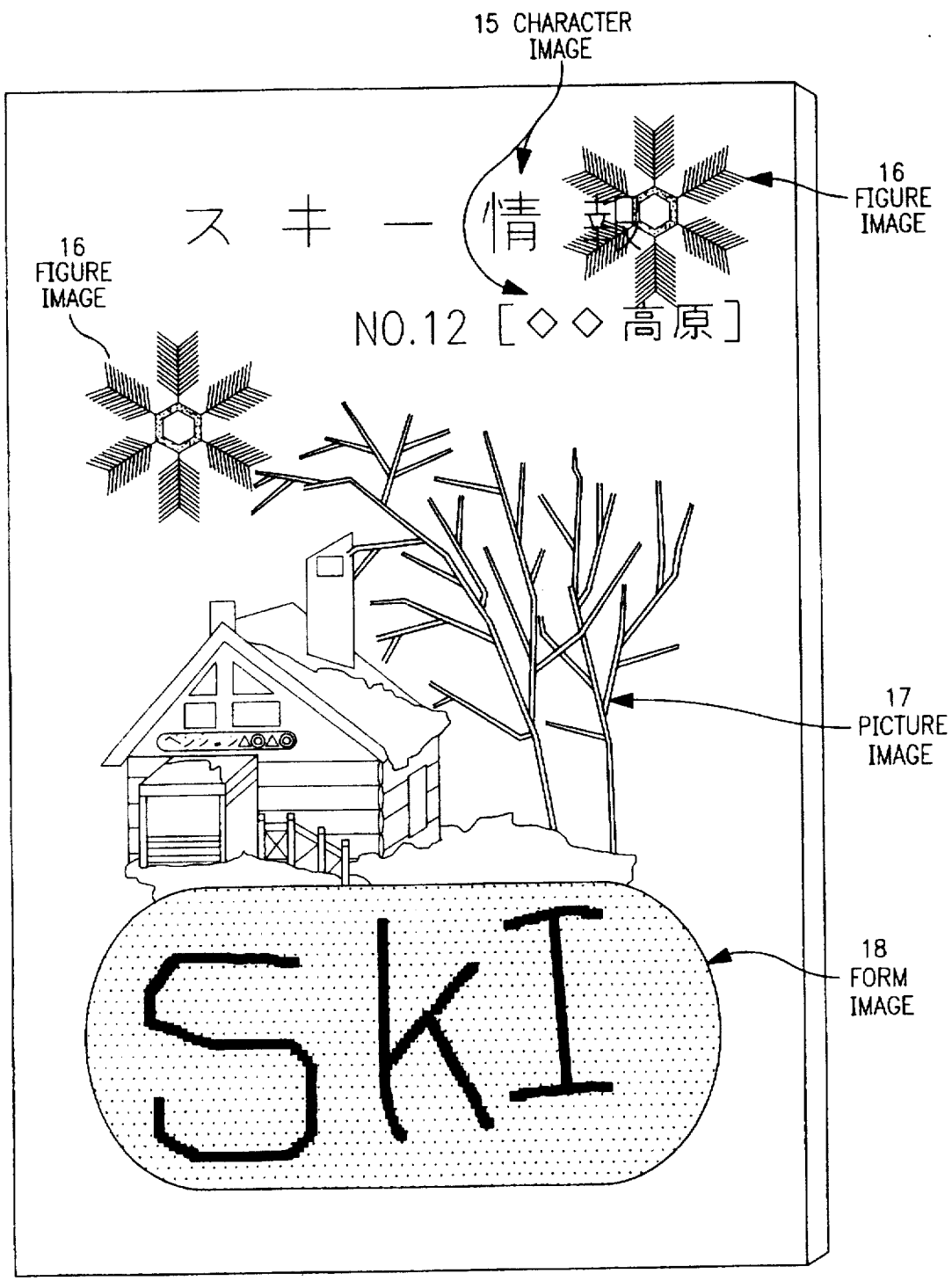

FIG. 2A–2C show examples of documents which can be created by the present invention. FIG. 2A shows a whole document, in which the first page is the front cover, the eighth page is the back front cover, the second to seventh pages sandwiched between the front and back covers are documents based on a format in which the definitions of the number of classes, width of class, page number, form, etc. are different. Further, even among the second to seventh pages, the forms differ depending on the odd page and even page. The document becomes a double-spread document in which after both sides are printed, the second page is printed on the back side of the front cover and the fourth page is printed on the back side of the third page.

FIGS. 2B and 2C show the front cover and second page of this document. In the diagram, reference numerals 15 and 19 denote character images; 16 and 20 indicate figure images; 17 and 21 denote picture images; 18 and 22 denote form images. When four kinds of images overlap, they are overlapped and displayed on the basis of the priorities in accordance with the following order: the character image, the figure image, the picture image, and the form image.

INPUT EDIT SCREEN

Figure 3A:
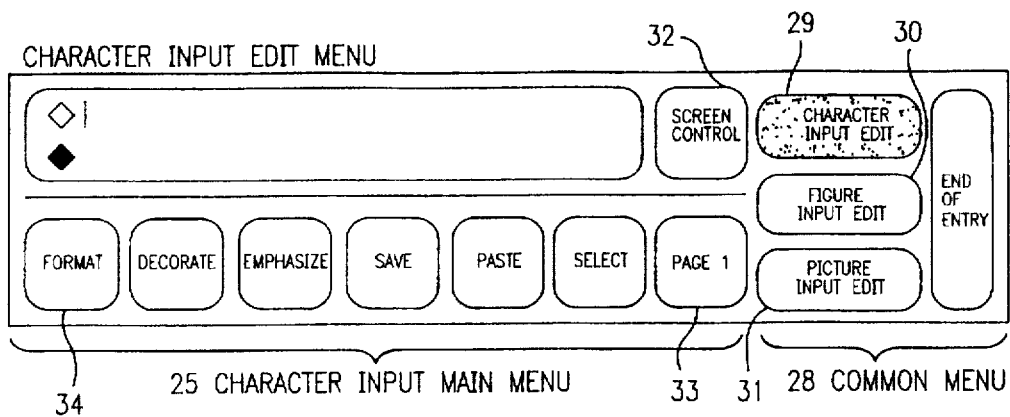
Figure 3B:
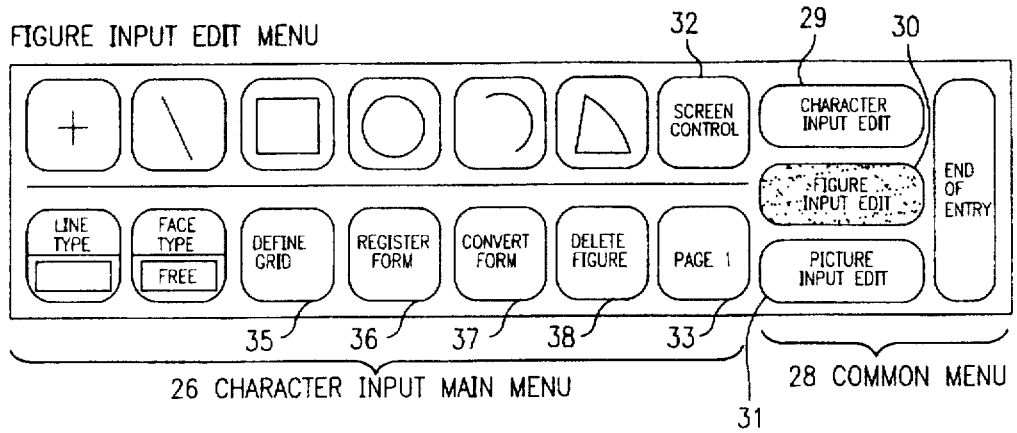
Figure 3C:
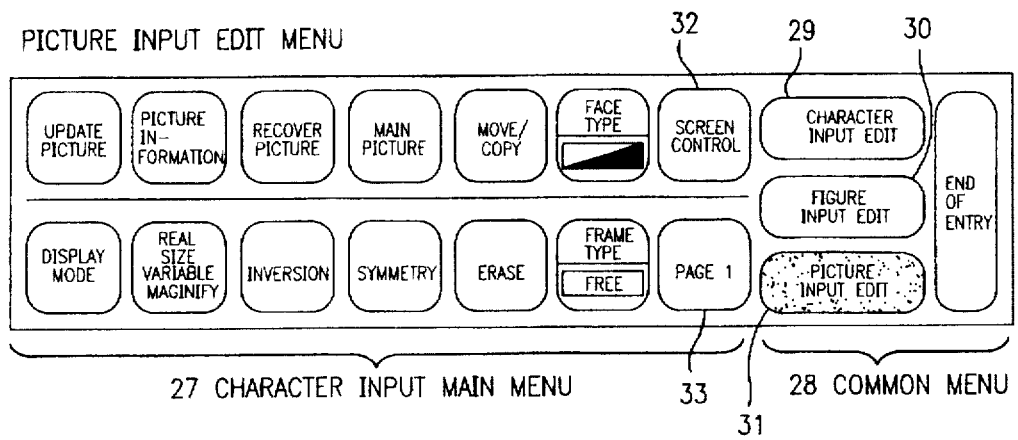

FIGS. 3A–3C are diagram showing input edit menues (an operator can select the kind of input and the kind of process by selecting desired commands displayed in these menues) which are displayed in the lower portions of the display screen after the document editing is newly started in order to enable the document editing as shown in FIGS. 2A–2C to be performed. FIG. 3A shows a character input edit menu. FIG. 3B indicates a figure input edit menu, and FIG. 3C represents an image input edit menu. By exchanging these menues, three kinds of images can be input into the same document. These menues are classified into a common menu 28 which can be selected any time during document editing and main menues 25, 26, and 27 indicative of the possible processes among predetermined input modes. When a command is selected from the main menues 25, 26, and 27, there is a case where a sub-menu 23 as shown in FIG. 3E is displayed in place of the main menues 25, 26, and 27 or where a further branched sub-menu is displayed in place of the main menues by indicating a command in the sub-menu. On the other hand, there is also a case where the sub-menu is displayed as another different frame onto the display screen other than the display areas of the main menues 25, 26, and 27. A "screen control" command 32 is provided irrespective of the kind of input editing and indicates that the sub-menu 28 to perform the "screen control" shown in FIG. 3E can be displayed any time.

Figure 3D:
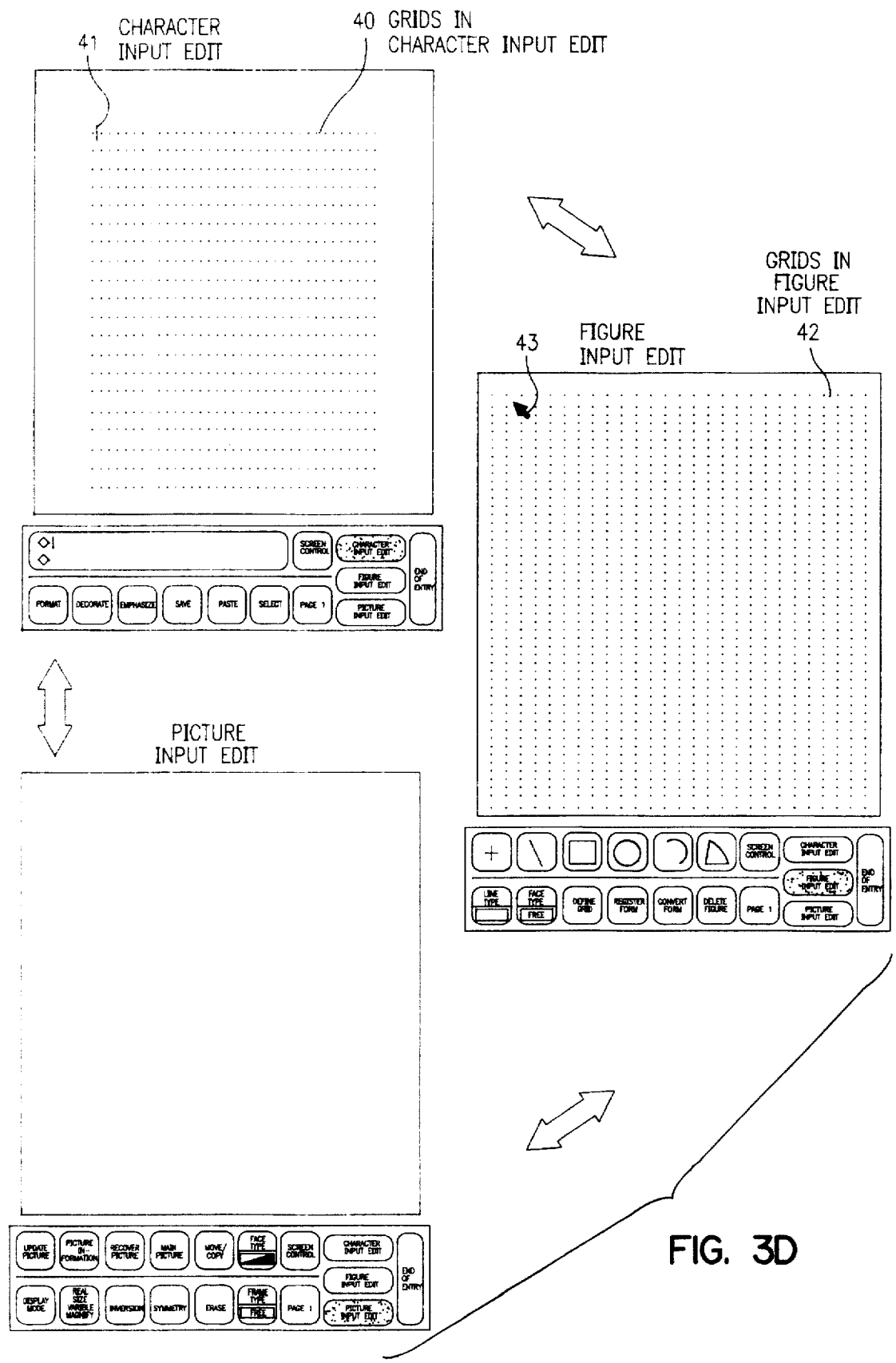
Figure 3E:
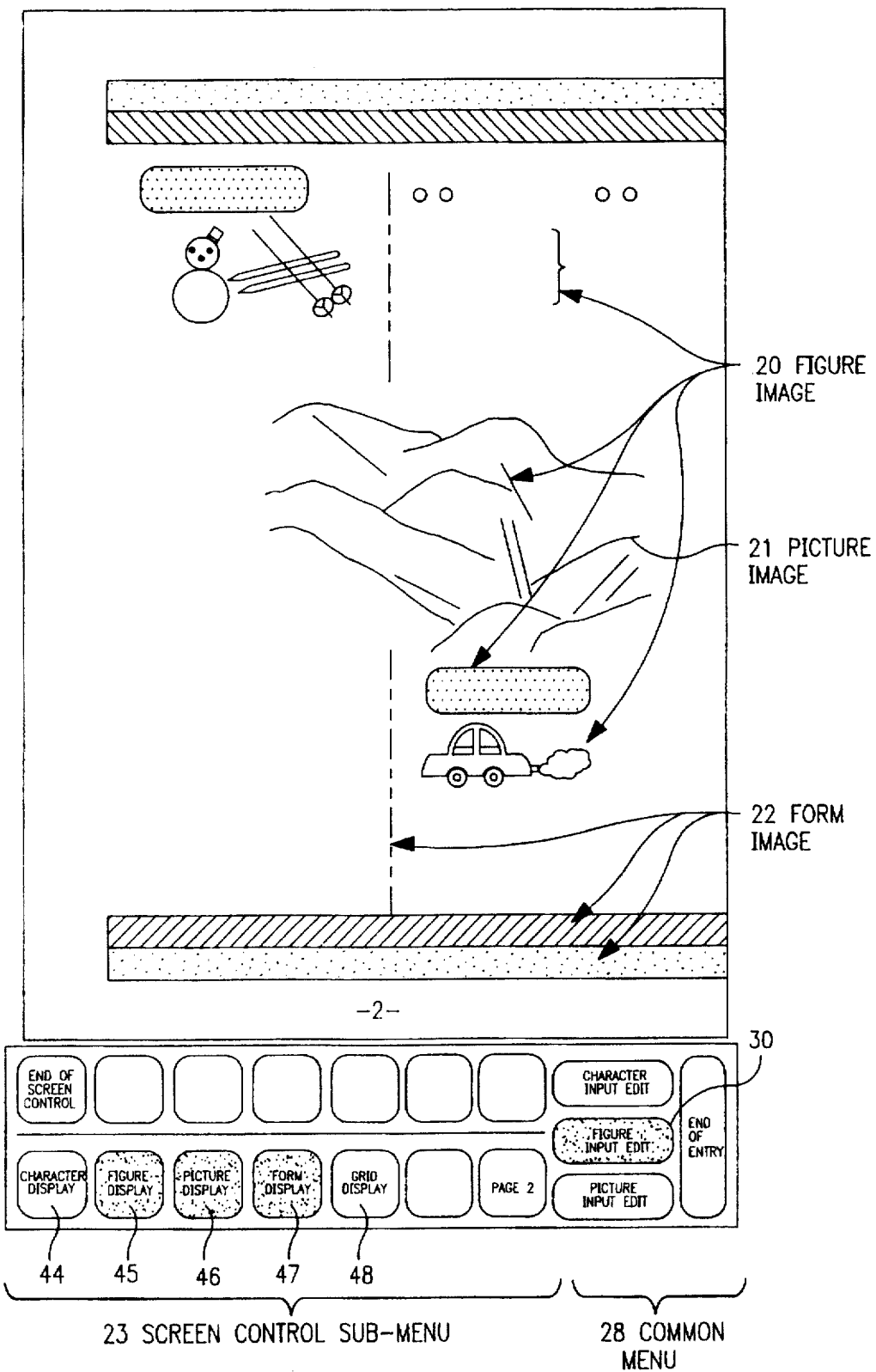

FIG. 3D shows that the display contents of the main menues 25, 26, and 27 and the grids are changed by changing the kind of input editing. The grids are a supporting function to determine the positions and sizes of characters and figures and are not printed. Reference numeral 40 denotes grids in the character input edit and 42 indicates grids in the figure input edit. The grids 42 can define the relative origin position and interval and, further, can define whether a figure to be input is "adaptive" to the grids or not and can change the contents of the definitions. Reference numeral 41 denotes a cursor to input characters and 43 also indicates a cursor to is input a figure. The cursor 43 is moved synchronously with the pointing device 9 and a figure is input by the cursor 43. At this time, if a figure to be input is "adaptive" to the grids and this fact is indicated, an accurate figure can be promptly input.

FIG. 3E is a diagram showing a state after the non-display of the character image among the images which had already been input was indicated by displaying the screen control sub-menu 23 by indicating the "screen control" command 32 from the main menu during figure input edition. There is an advantage such that the current input editing (figure input editing in this case) can be easily performed by the screen control process.

OPERATING PROCEDURE

Figure 4:
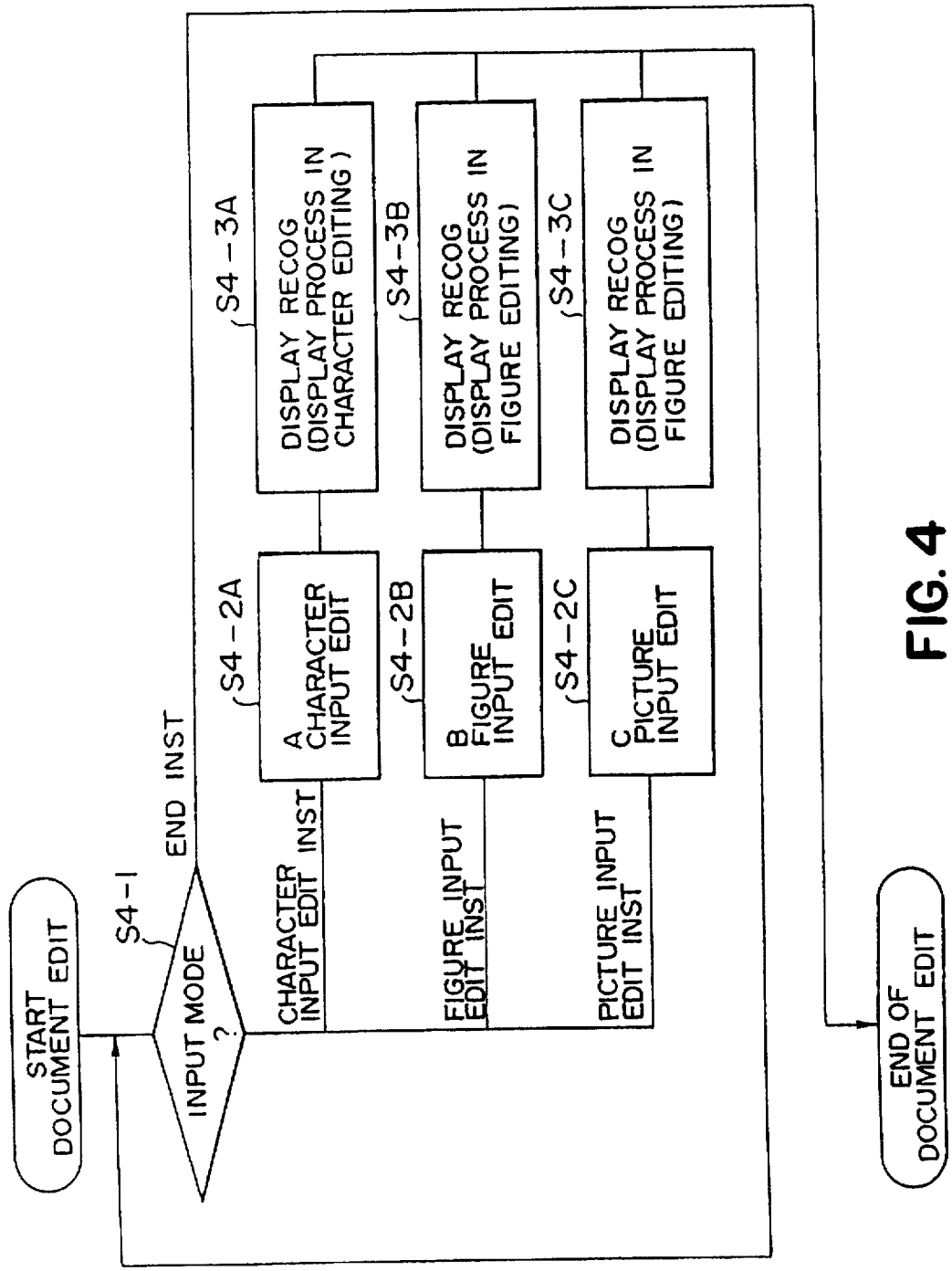
FIGS. 4 and 5C are flowcharts showing the operating procedures when the document editing as shown in FIGS. 2A–2C is executed.
Figure 5A:
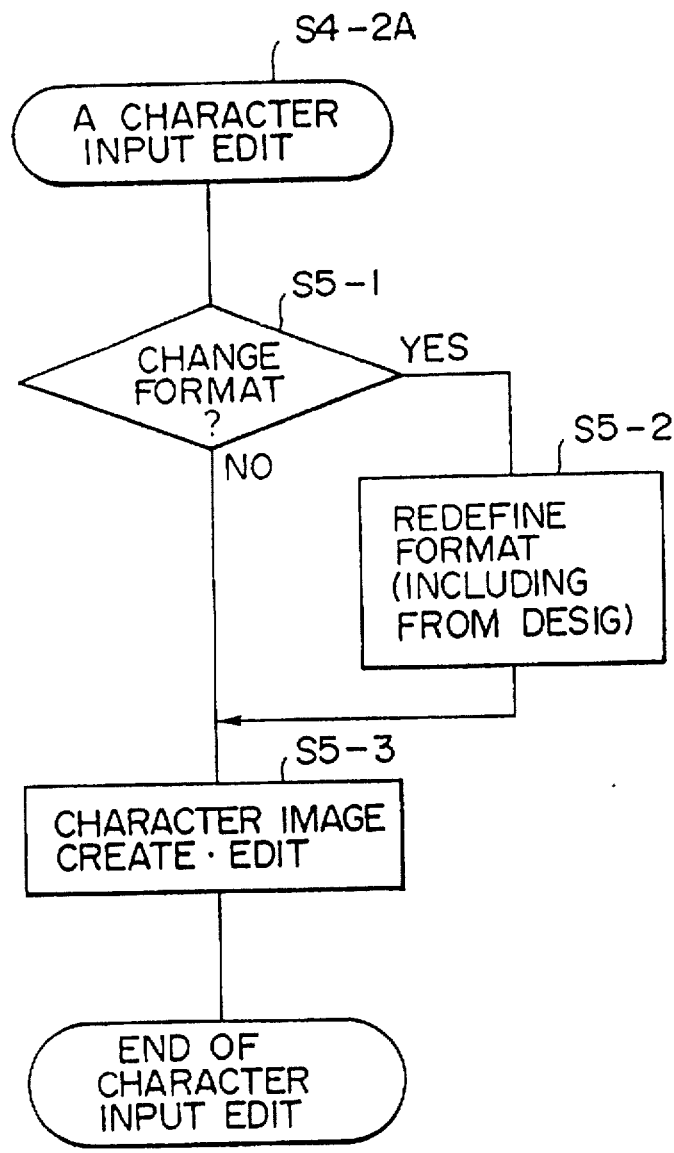
Figure 5B:
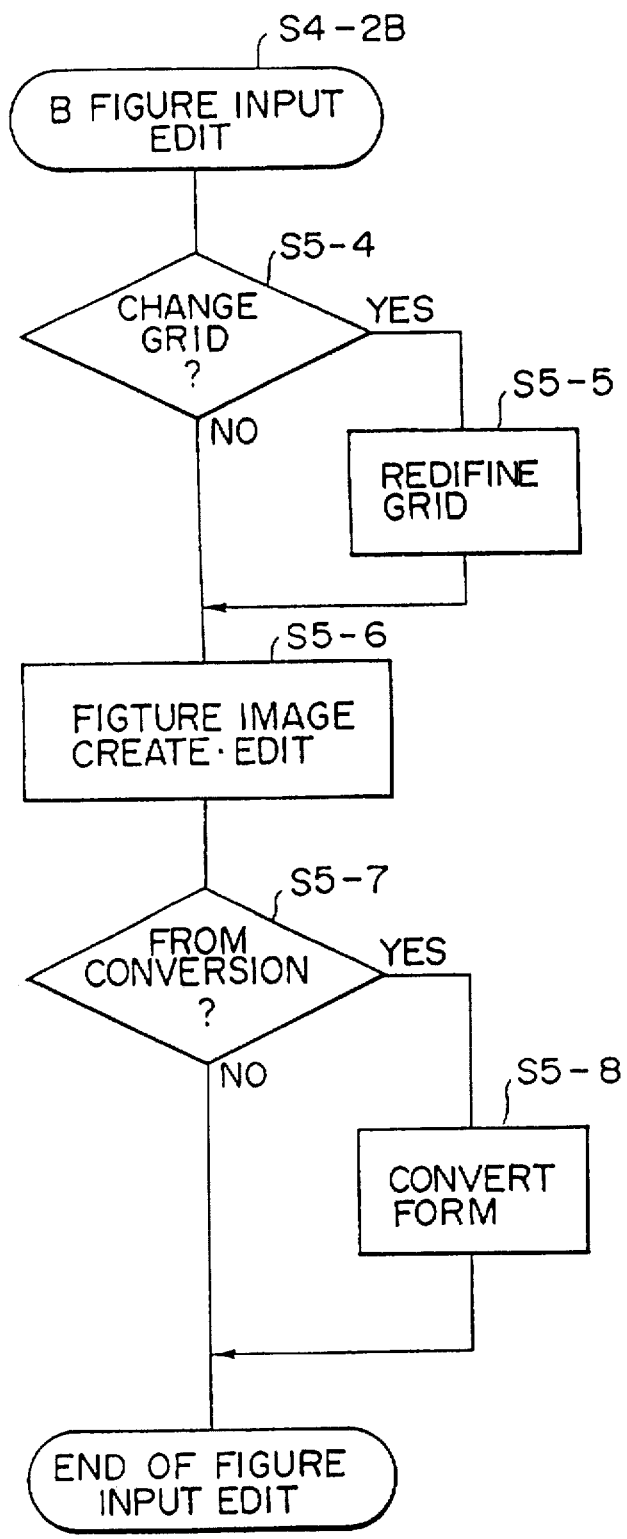
Figure 5C:
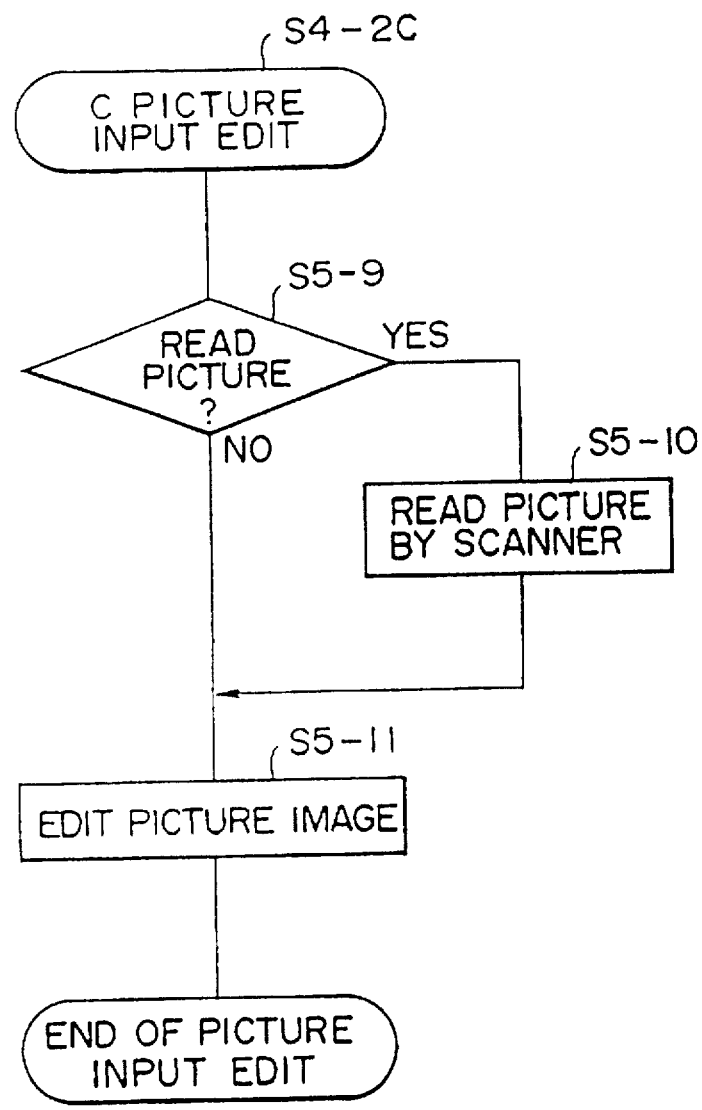

FIGS. 4 and 5A–5C are flowcharts showing the operating procedures when the document editing as shown in FIG. 2A–2C is executed. FIG. 4 is a diagram showing the schematic operating procedure and indicates that the display content is checked after completion of the input editing and the input mode can be changed at any time. FIG. 5A–5C showing the operating procedure for every input mode which can be selected in step S4-1 in FIG. 4. The character input edit A corresponds to step S4-2A, the figure input edit B corresponds to step S4-2B, and the image input edit C corresponds to step S4-2C. (The details will be described hereinbelow.)

DOCUMENT WHICH IS BEING CREATED

Figure 6B:
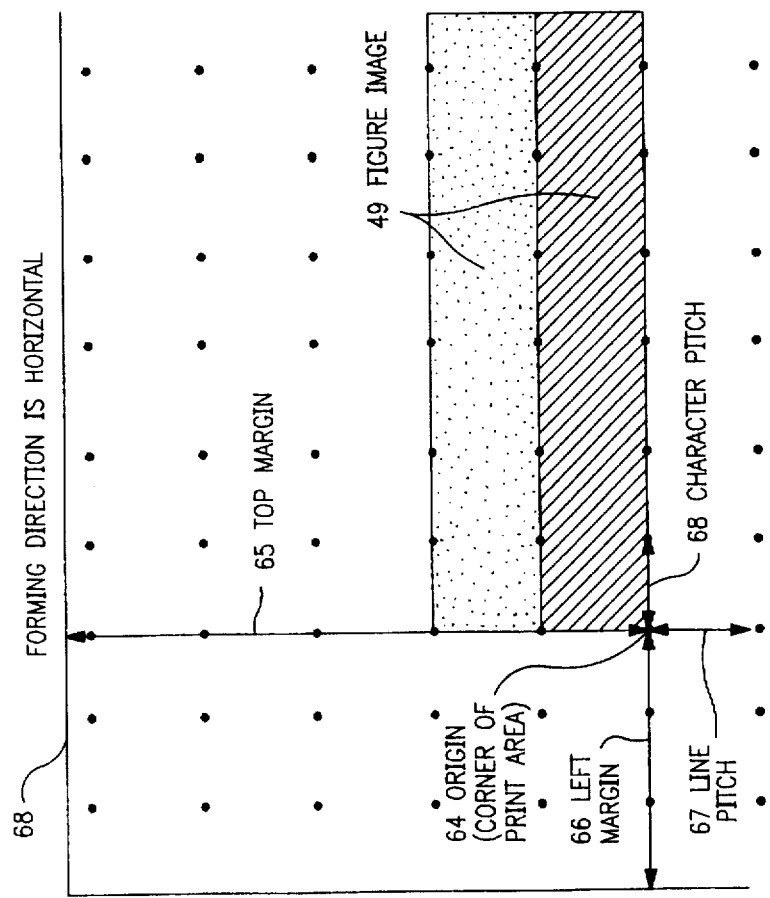
Figure 6A:
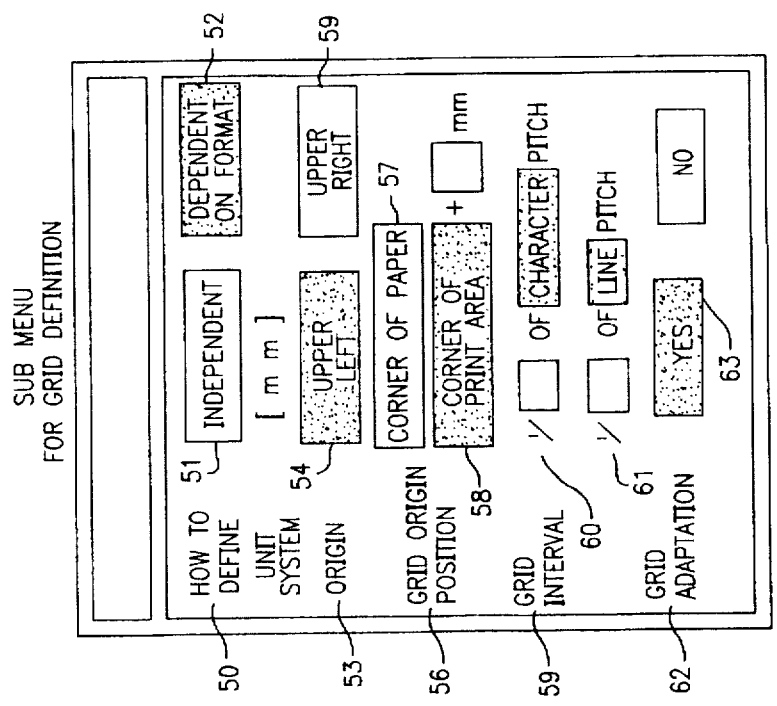
Figure 6D:
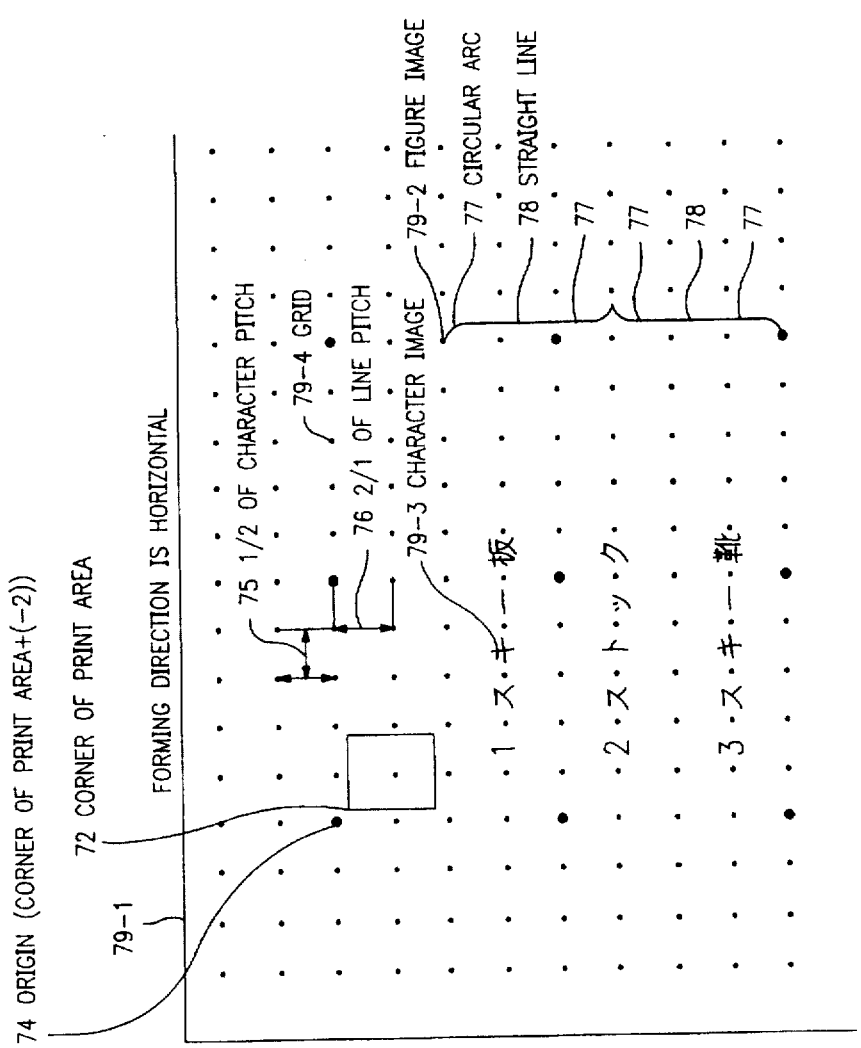
Figure 6C:
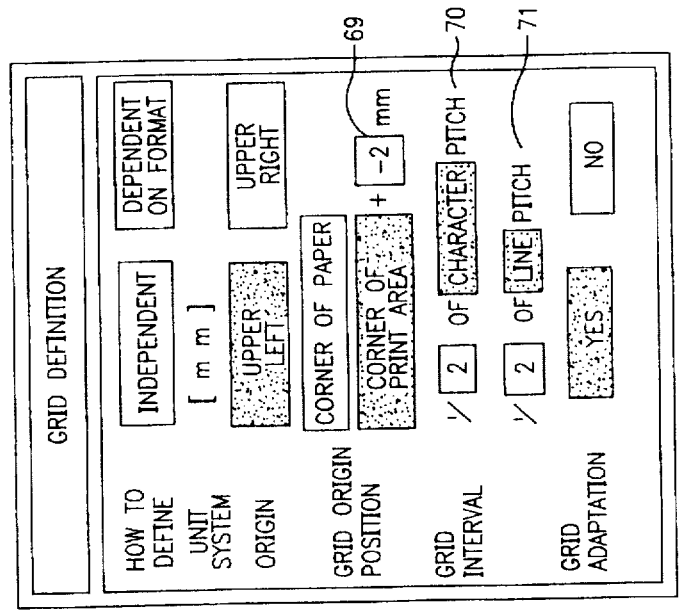

FIG. 6A–6G shows diagrams of sub-menues which are displayed on the screen and of a document which is being created when the document as shown in FIG. 2A–2C is being created with reference to FIGS. 4 and 5A–5C. FIGS. 6A and 6C show sub-menues of other frames to define the grids. FIGS. 6B and 6D show figure images 49 and 79-2 which were created in accordance with defined grids 79-4. In these images, origins are decided on the basis of corners 64 and 72 of the print areas (areas in which characters are printed) of documents 48 and 79-1 as references, the grid intervals are defined on a line pitch and character pitch unit basis depending on the format, and the grids are displayed. A character image 79-3 is not adaptive to the grids 79-4.

Figure 6E:
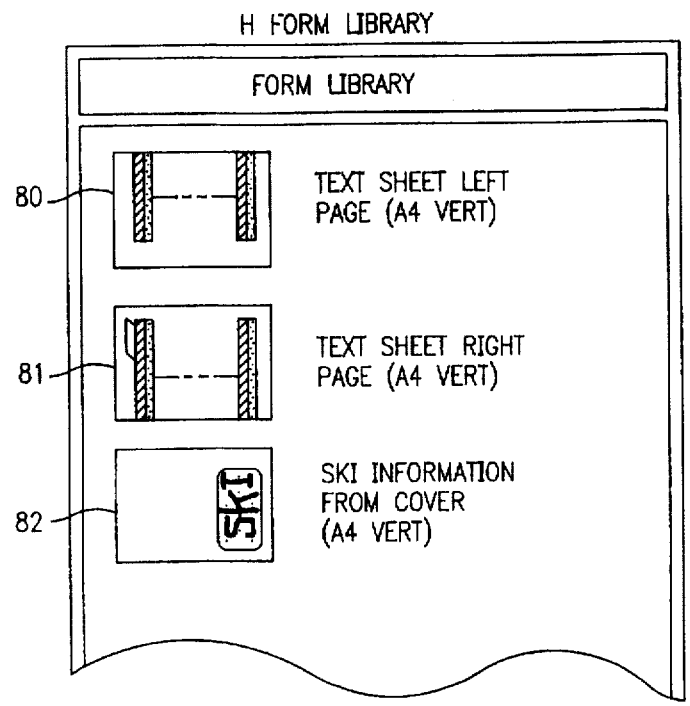
Figure 6F:
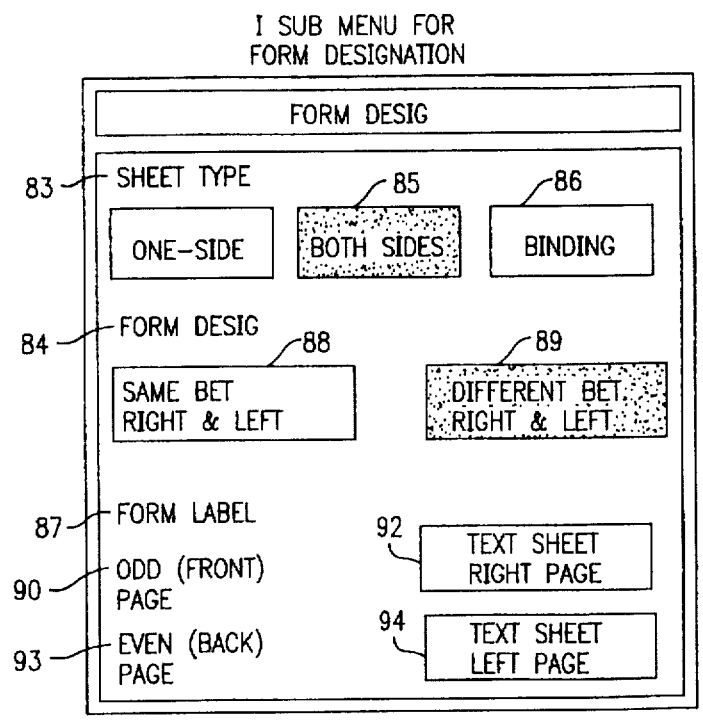
Figure 6G:
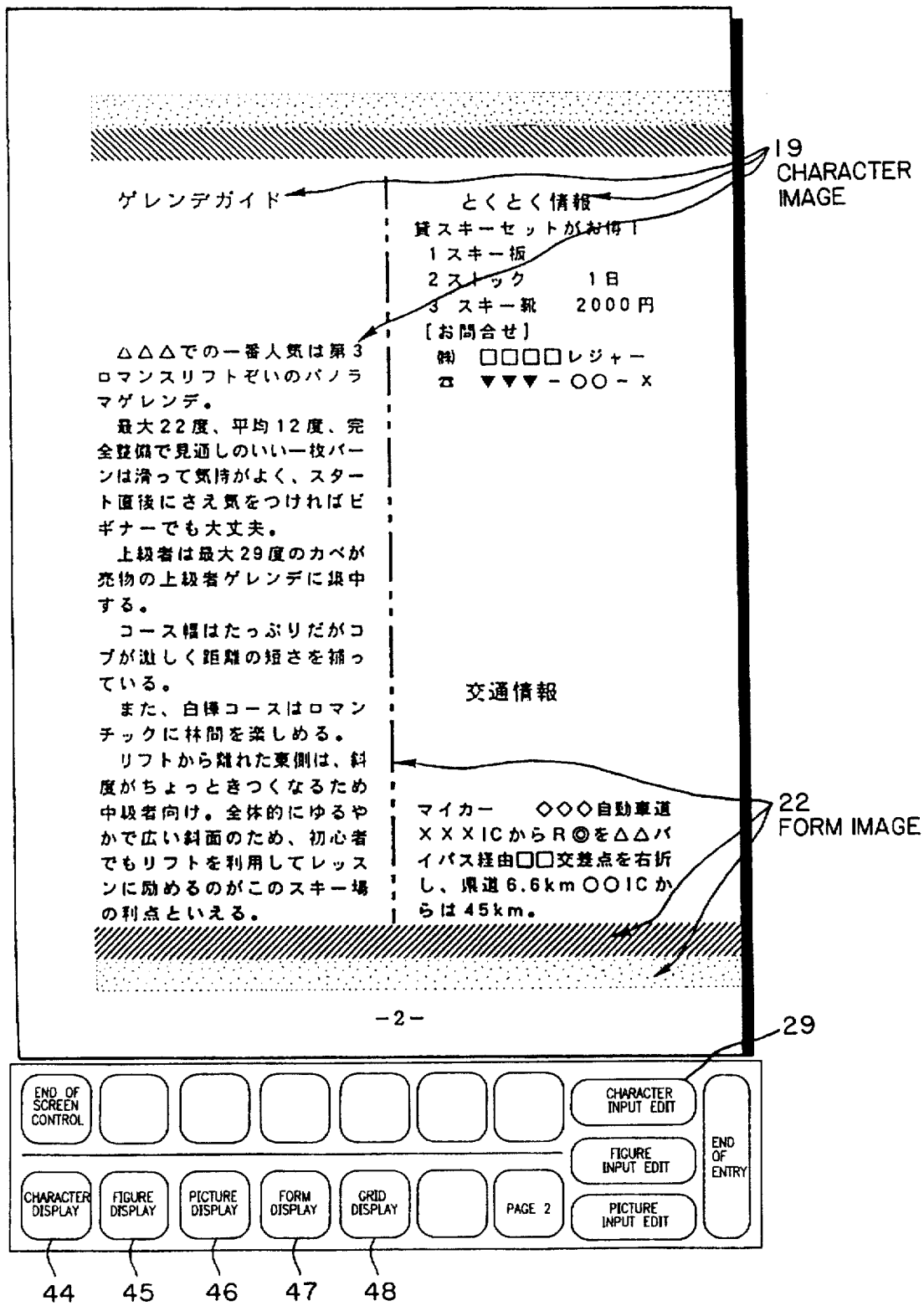

A form library shown in FIG. 6E is displayed in another frame when a figure image is registered as a form after it was created and when the form image is read out by the format definition. Reference numerals 80, 81, and 82 denote reduced picture characters of the figure images which have been created and have already been registered as forms. FIG. 6F shows a sub-menu to designate a form and this sub-menu is displayed in another frame when a form image is read out by the format definition. FIG. 6G shows a state of a document when the instruction about the display/non-display of an arbitrary image other than during the input editing was given from the sub-menu 23 to perform the screen control while the second page of the document shown in FIG. 2C is being edited.

In this example, the instruction of the non-display of both of the picture image and the figure image was given during the character input editing. (The details will be described hereinlater.)

DATA STRUCTURE

FIGS. 7A, 7A-1, 7A-2, 7B, 7B-1, 7B-2 are diagrams showing data structures of the invention.

Figures 2, 7A:
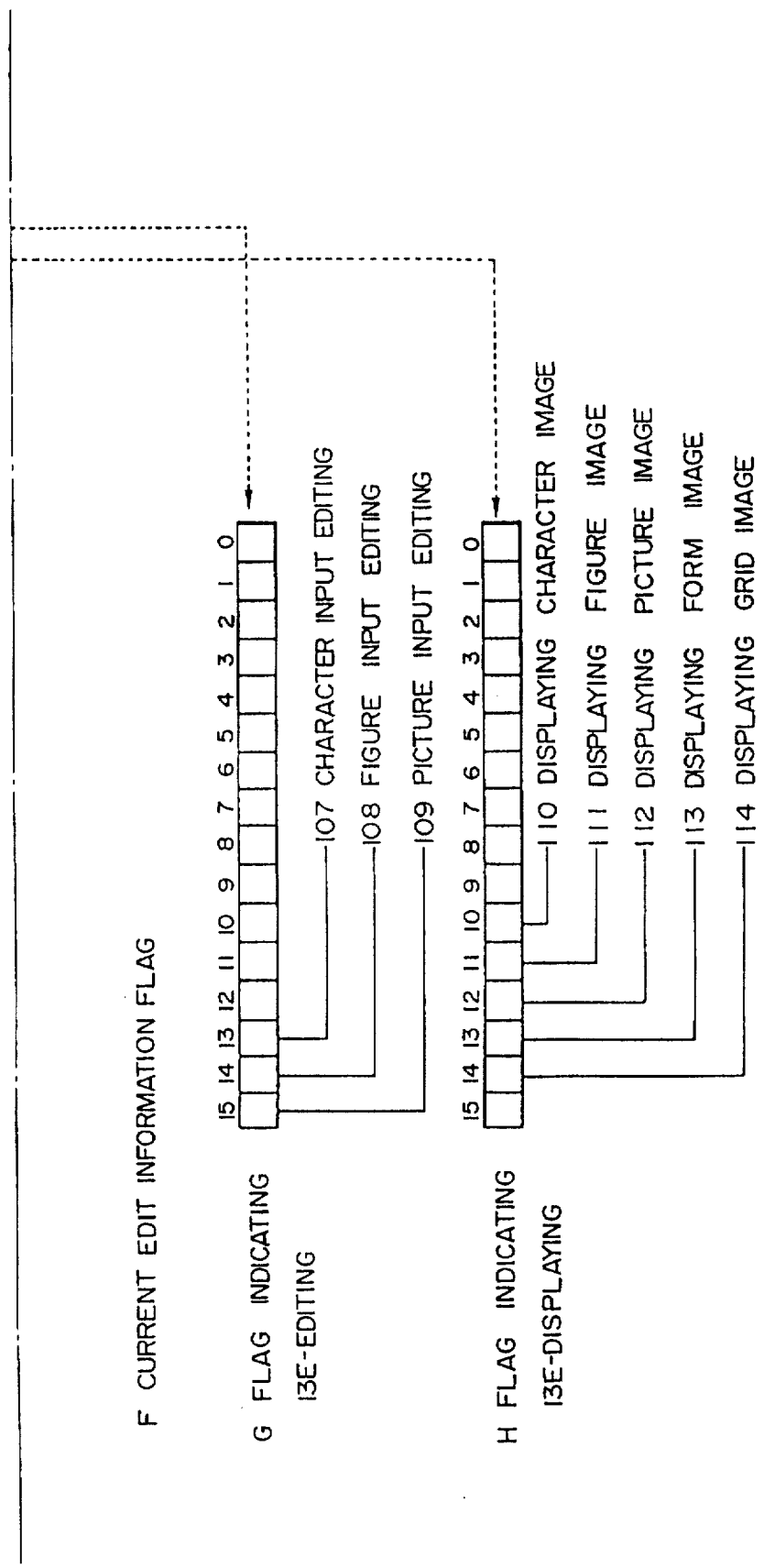
FIG. 7A shows the relationship of FIGS. 7A-1 and 7A-2.
Figures 1, 7B:
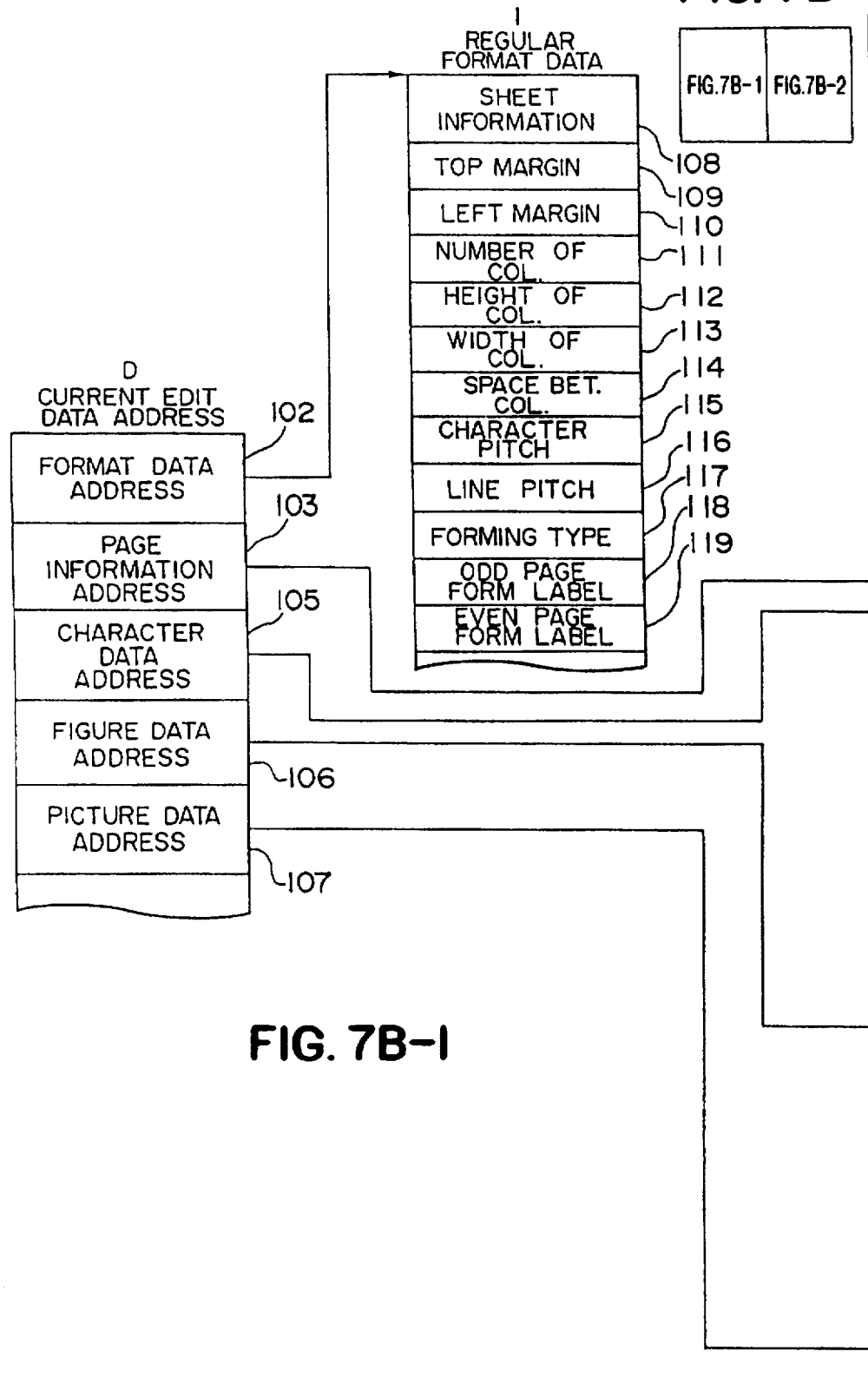
FIG. 7B shows the relation of FIGS. 7B-1 and 7B-2.
Figures 2, 7B:
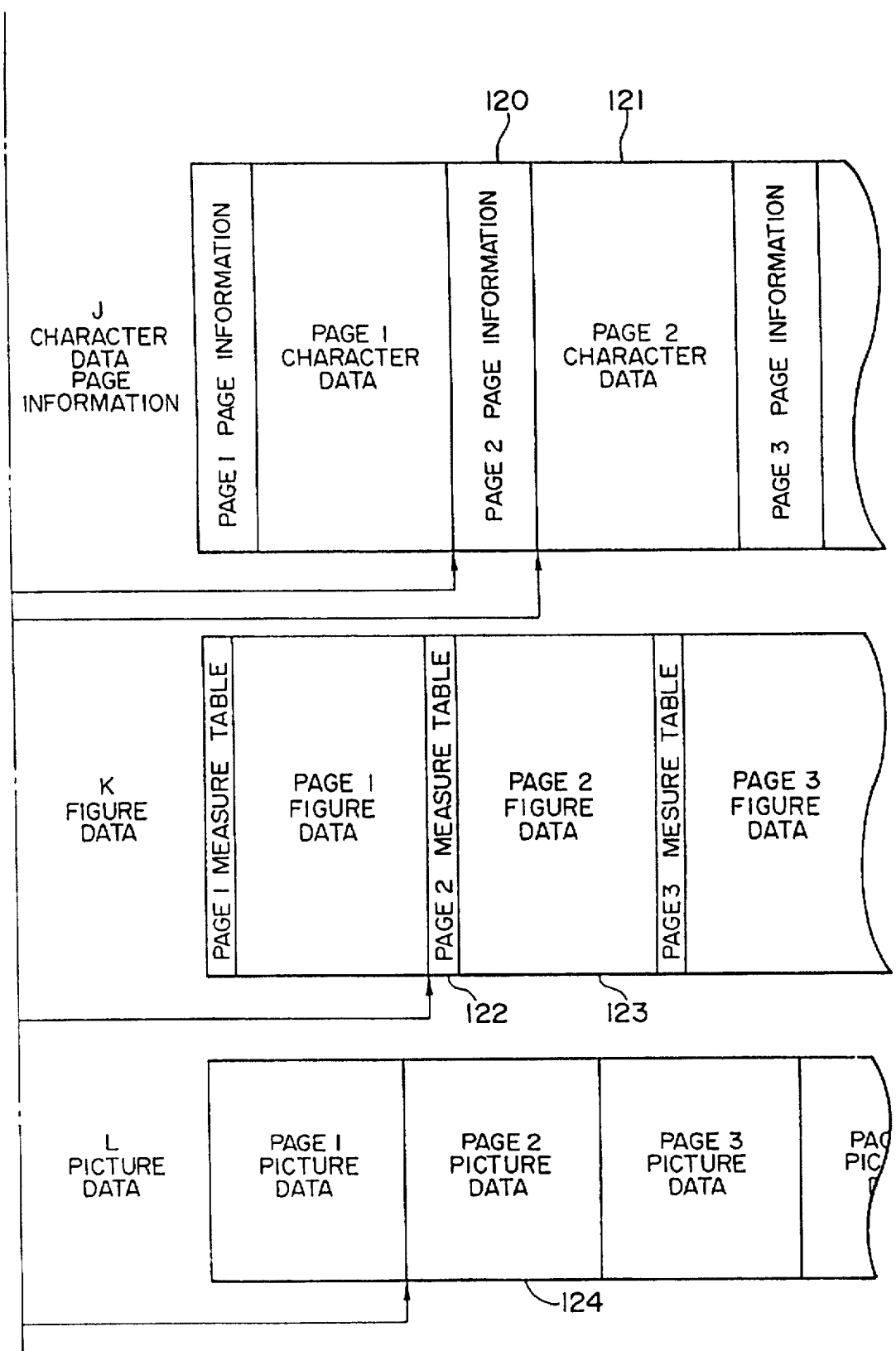

FIGS. 7A, 7A-1, and 7A-2 shows a state after the document as shown in FIG. 2 was read out of the hard disk unit 6 or floppy disk unit 12 in FIG. 1 and stored into the main memory 5. A flag 100 indicating be-editing, a flag 101 indicating be-displaying, a D current edit data address, etc. which are most concerned with the present invention are stored in a C current edit information section in a B header portion. FIGS. 7B, 7B-1 and 7B-2 show a D current edit data address table in FIGS. 7-A, 7A-1, and 7A-2 after the document as shown in FIG. 2 was created. FIGS. 7B, 7B-1, and 7B-2 relate to the case where the second page is being displayed. (The details will be described hereinlater.)

DISPLAY PROCESS

FIGS. 8A–8D are diagrams showing the internal display processes which are executed when 1 an indication of redisplay, 2 an indication of display/non-display of an arbitrary image, 3 an indication of a change of the input mode, and the like are given by the operator. This shows that the form image, the picture image, the figure image, and the character image are displayed in accordance with this order opposite to the priorities (refer to the descriptions of FIGS. 2B and 2C) on the display irrespective of the input mode. (The details will be described hereinlater)

IRREGULAR FORMAT DEFINITION (including form change)

FIGS. 9A, 9A-1, 9A-2, 9B, and 9C are diagrams regarding the irregular format definition (including a change in form).

Figures 1, 9A:
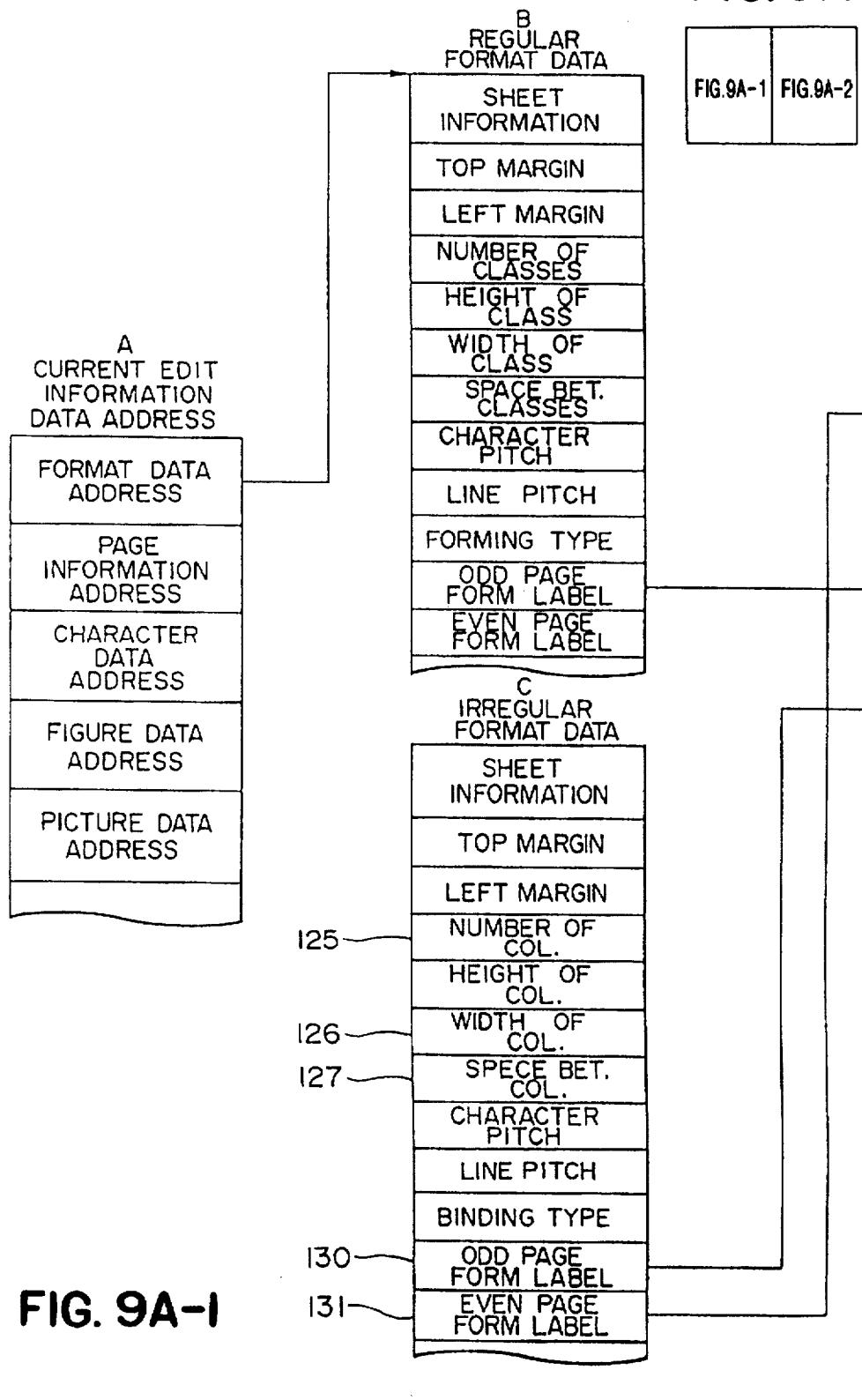
FIG. 9A shows relationship of FIGS. 9A-1 and 9A-2.
Figures 2, 9A:
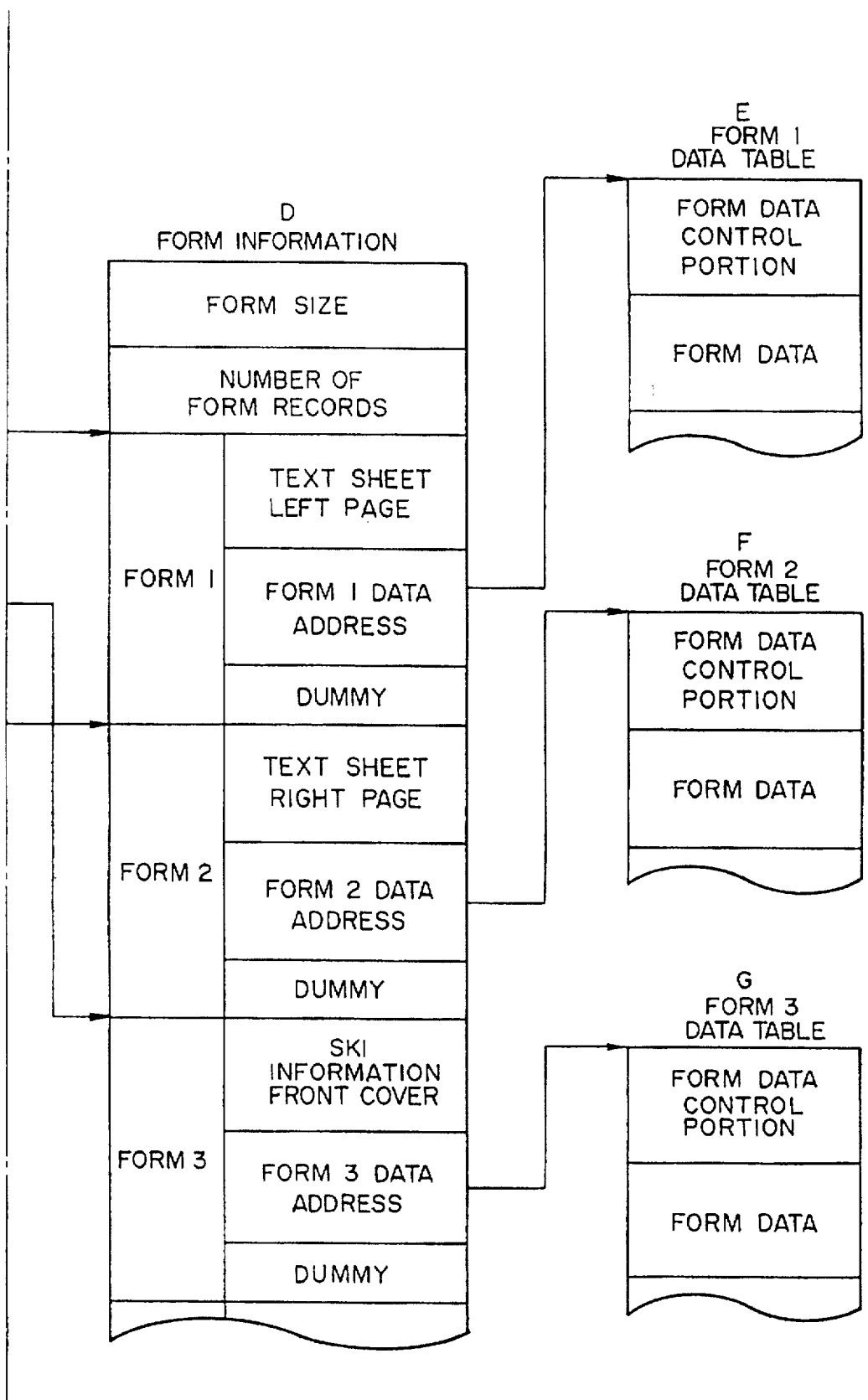

FIGS. 9A, 9A-1, and 9A-2 are diagrams showing a process for the definition of "irregular format" to be inserted between the front and back covers which is executed in step S5-2 in FIGS. 5A–5C. In the diagram, B indicates a diagram of a regular format and C indicates a diagram of an irregular format to be inserted. In the diagram, data of E form 1, F form 2, and G form 3 which have already been registered are stored in the D form information. Only the terms different from the regular format are designated by the operator. The changed data are set into a term 125 indicative of the number of classes, a term 126 indicative of a width of class, a term 127 indicative of a space between classes, a term 130 indicative of an odd page form label, a term 131 indicative of an even page form label, etc..

Figure 9B:
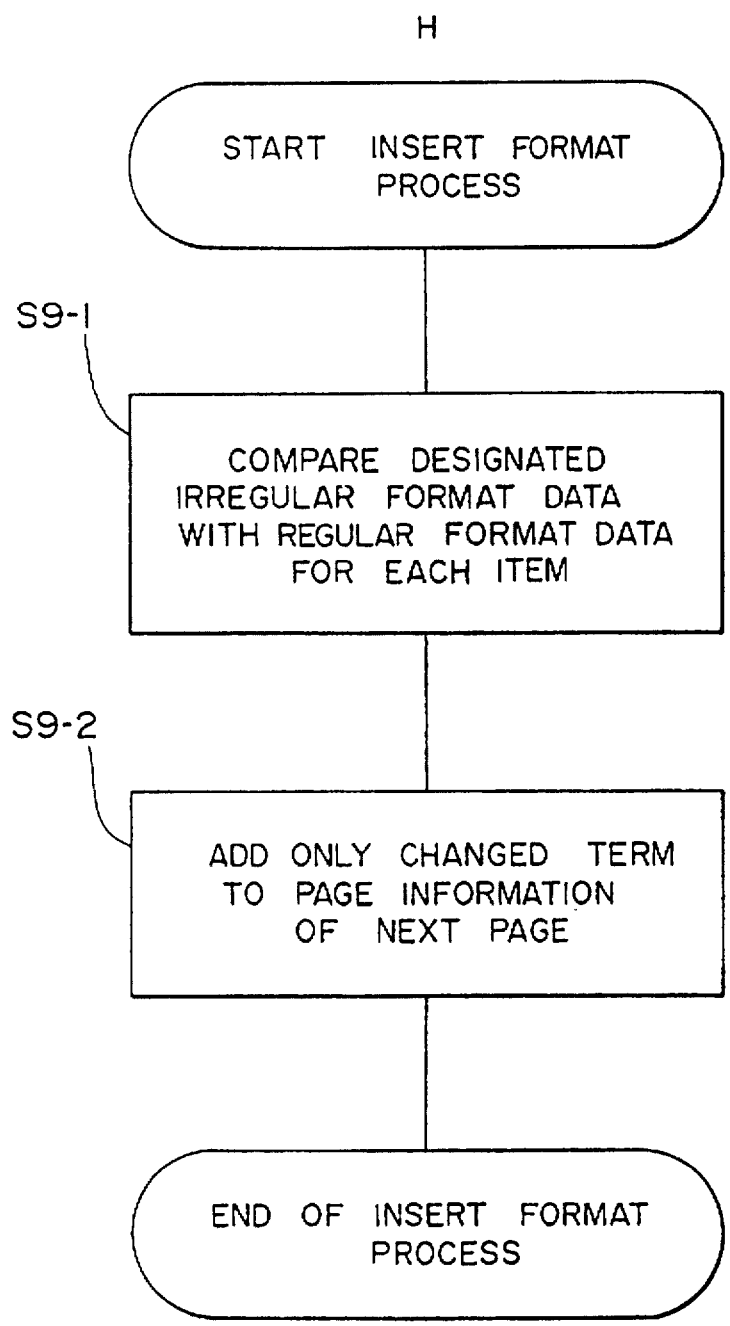

FIG. 9B practically shows the internal processes which are executed when an indication to actually insert an irregular format is given after the irregular format was defined.

Figure 9C:
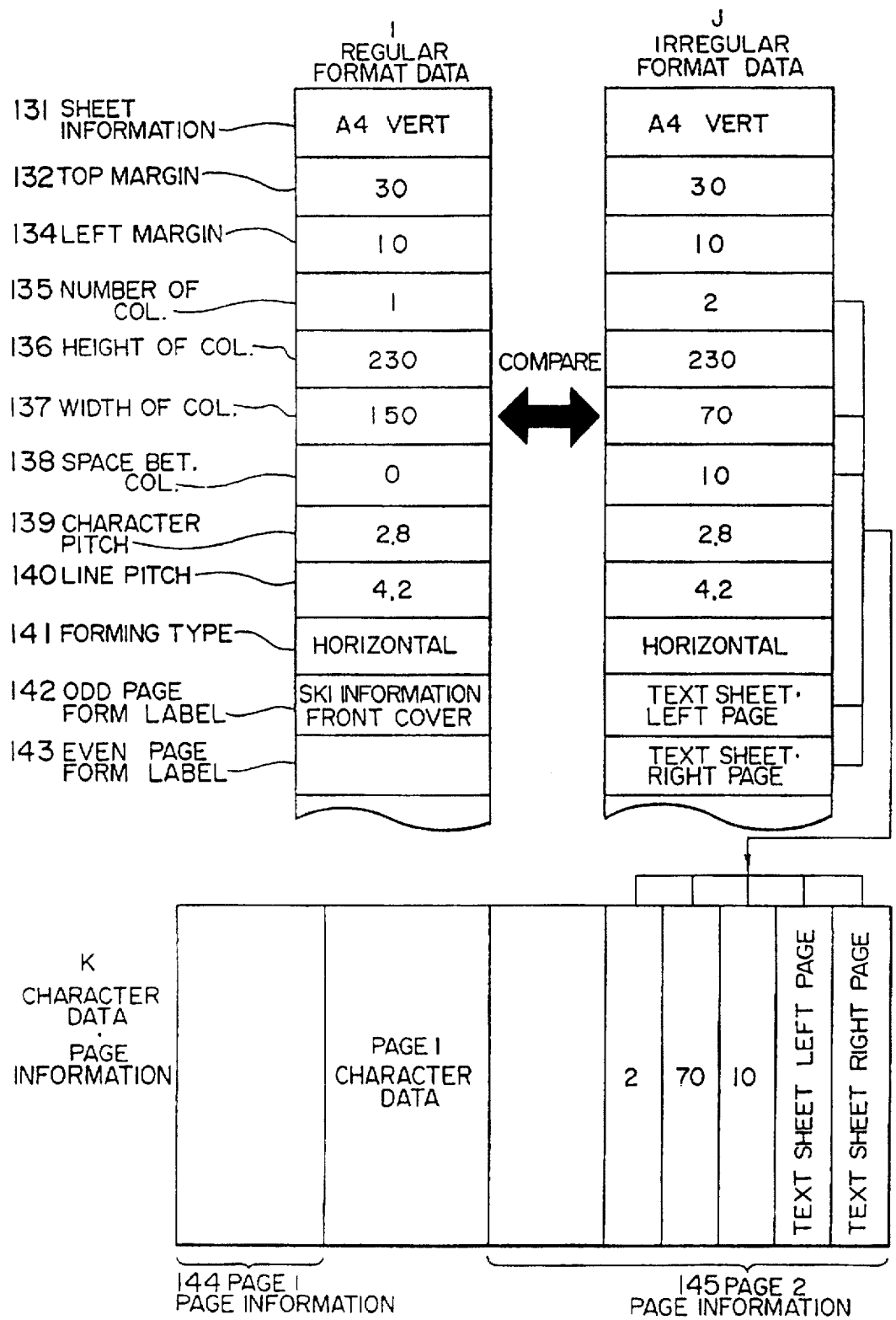
Figure 9D:
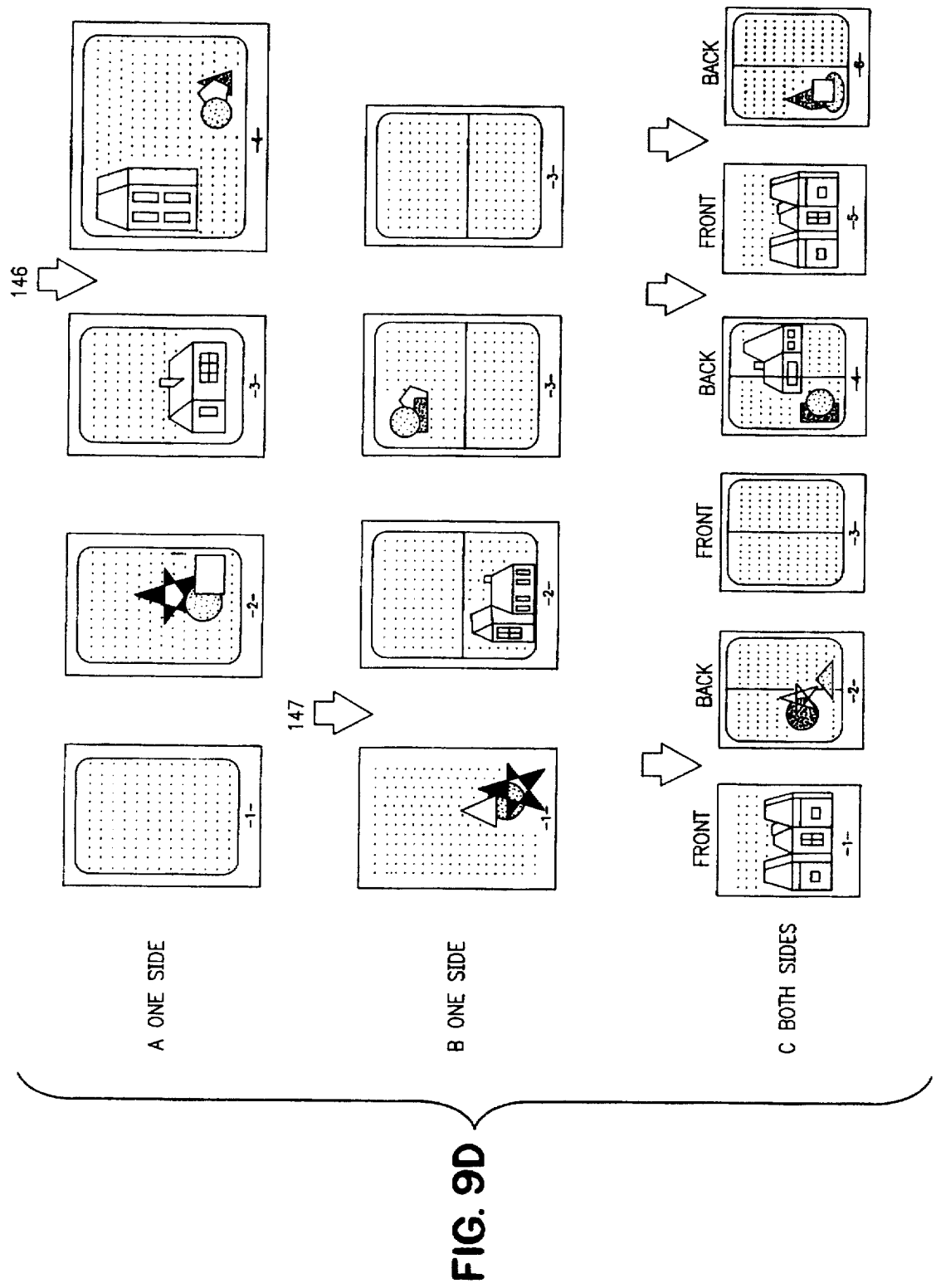
FIG. 9D is a diagram showing an example of a document which can be created by actually defining the irregular format.

FIG. 9D shows an example of a document which can be created by actually defining an irregular format. A format is changed during the document and, thereafter, it is returned to the original format. Such a document (including the document as shown in FIG. 2) could not conventionally been created by the single print. (The details will be described hereinlater).

GRID DISPLAY PROCESS (depending upon format)

Figure 10A:
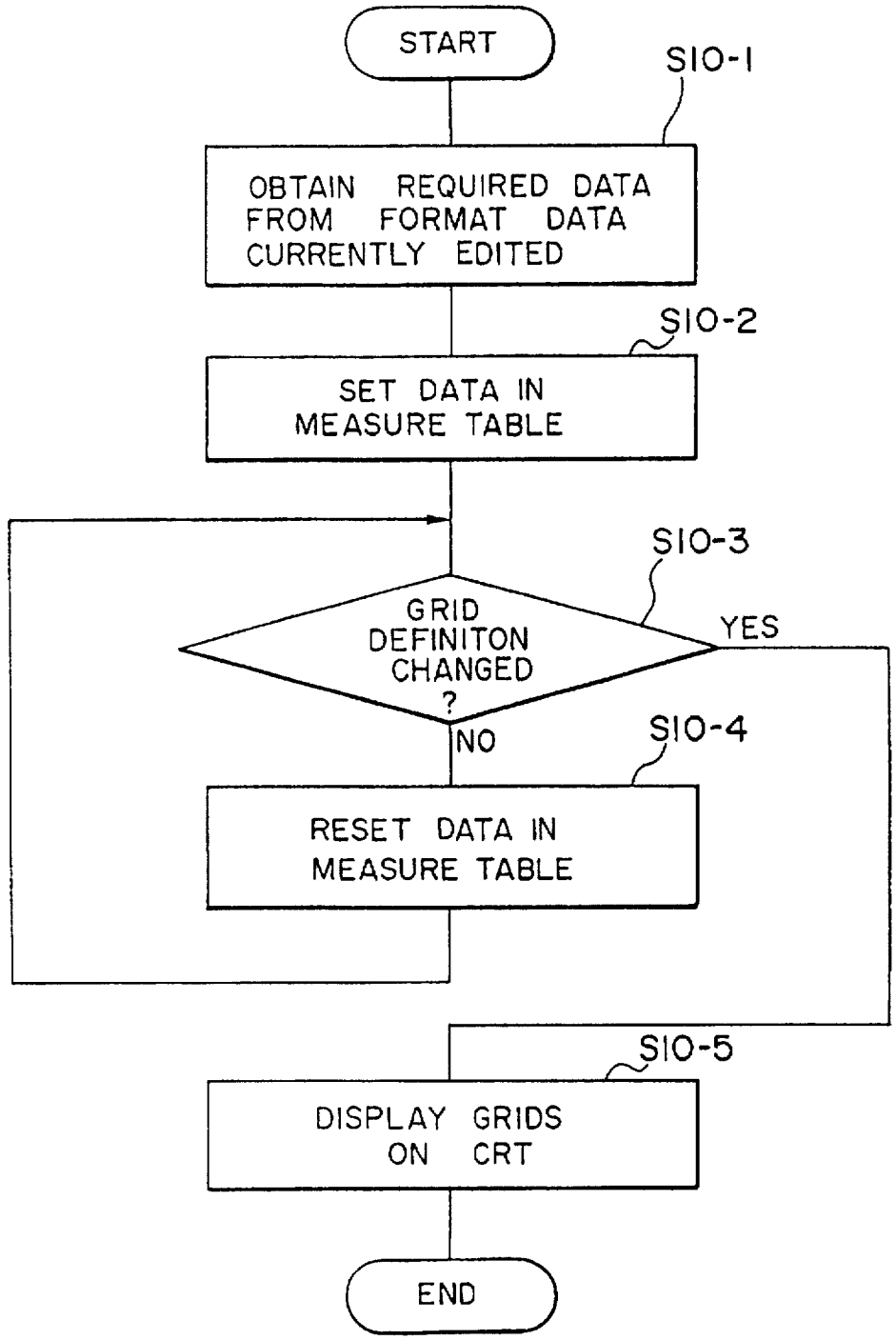
FIGS. 10A and 10B are diagrams showing the display process of the grids defined depending upon a format.
Figure 10B:
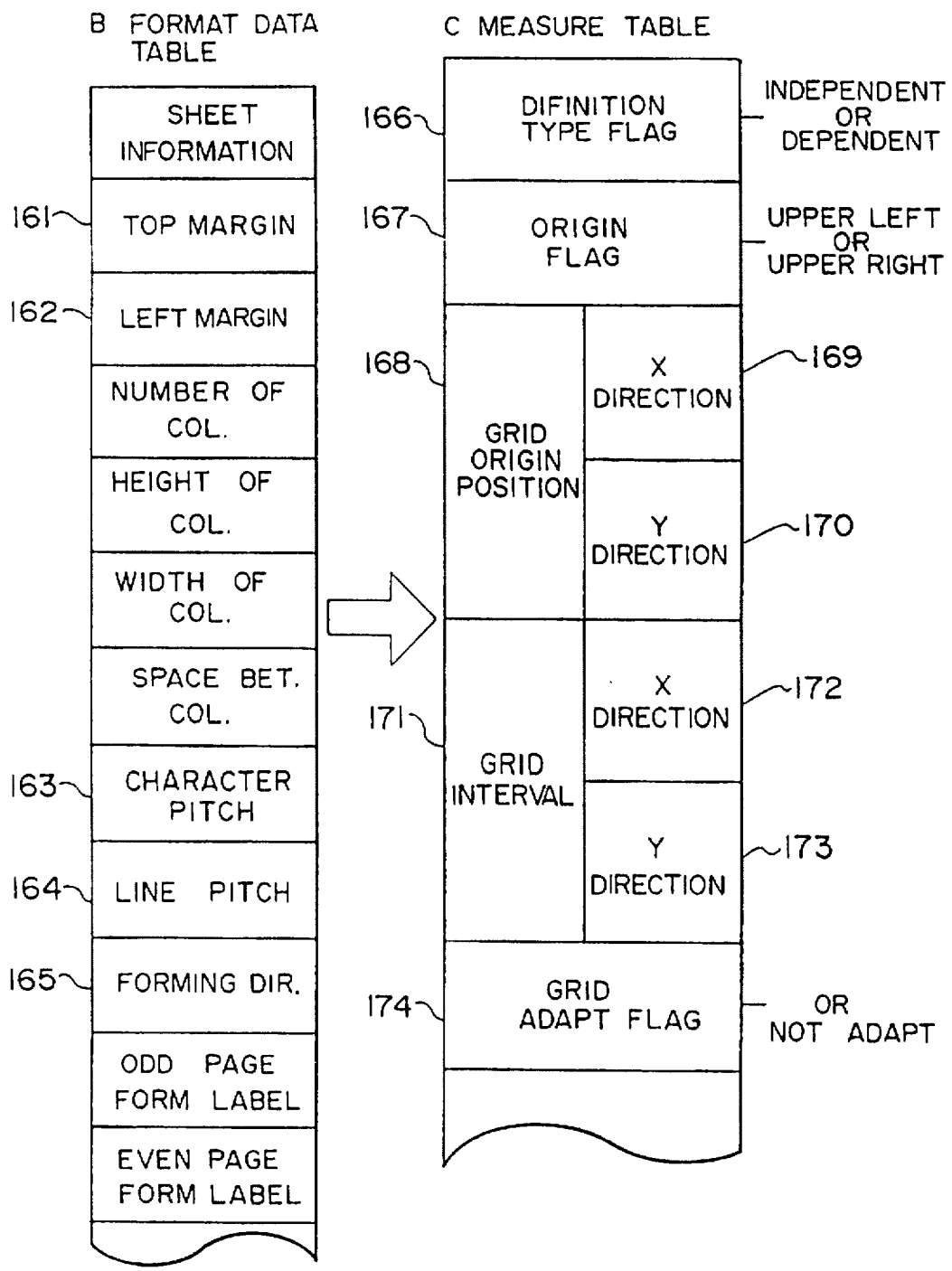

FIGS. 10A and 10B are diagrams showing the display process of grids defined depending upon a format.

In FIG. 10A shows a flowchart regarding the data processes which are executed in the case where after the operator had designated a "define grids" command 35 in the figure input edit menu, a sub-menu in another frame for the grid definition in FIG. 6A was displayed and, thereafter, the grid defining method was indicated to a "dependent on format" 52. FIG. 10B shows the format data in which data which is referred when the grids are displayed depending on the format is set and the details of measure table provided in the head portion of the figure data of each page shown in FIG. 7B. (The details will be described hereinlater.)

(Prior Art) FORM REGISTRATION AND DISPLAY

Figure 11:
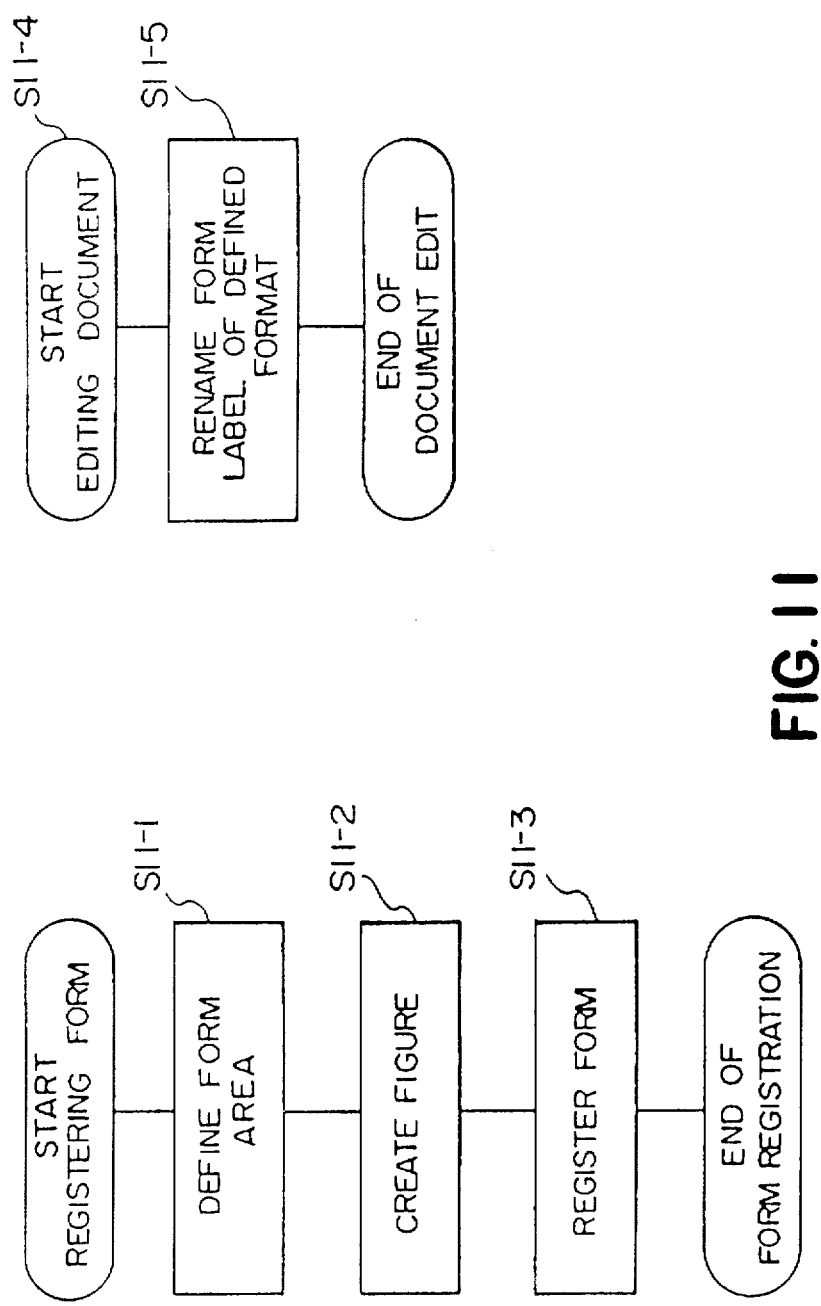
FIG. 11 is a flowchart showing a conventional operating procedure to register a form and subsequently display this form into a character creating area.

FIG. 11 shows a flowchart for the conventional operating procedure until the figure created by the operator is registered as a form and displayed in the form character creating area. (The details will be described hereinlater.)

(Present Invention) FORM REGISTRATION AND DISPLAY

Figure 12A:
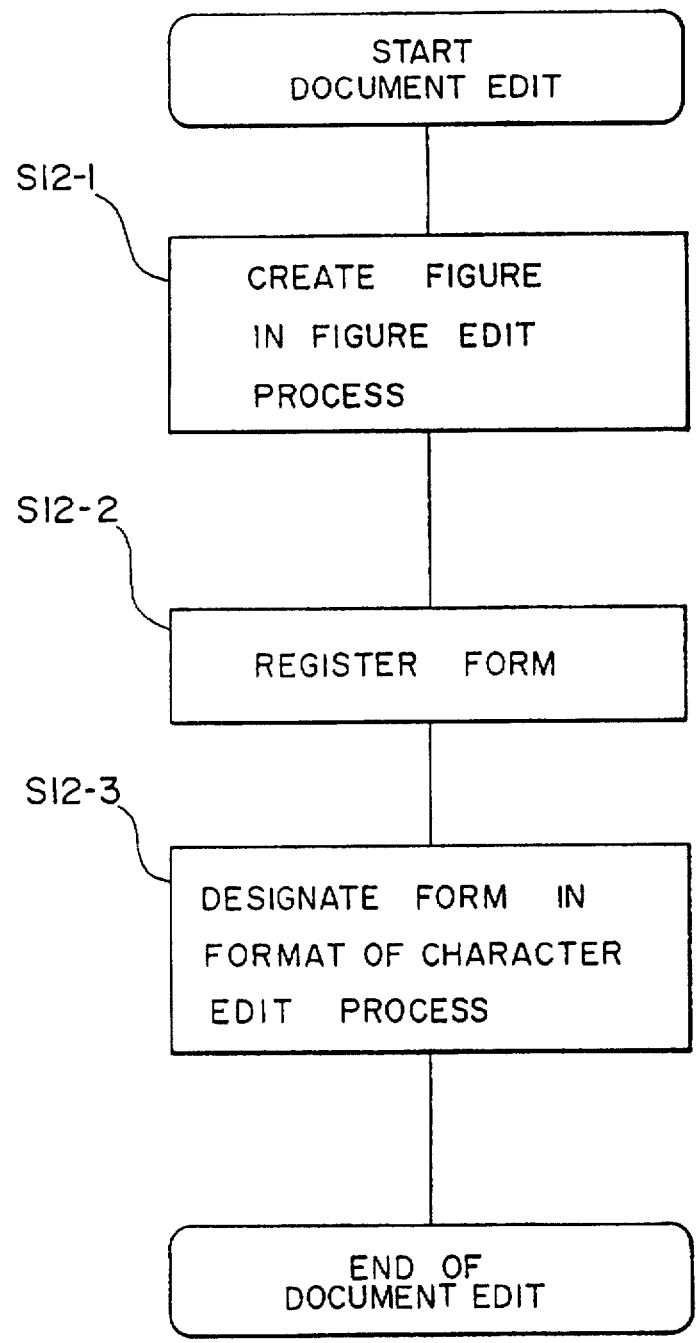
FIGS. 12A and 12B are diagrams regarding the form registration according to the invention.
Figure 12B:
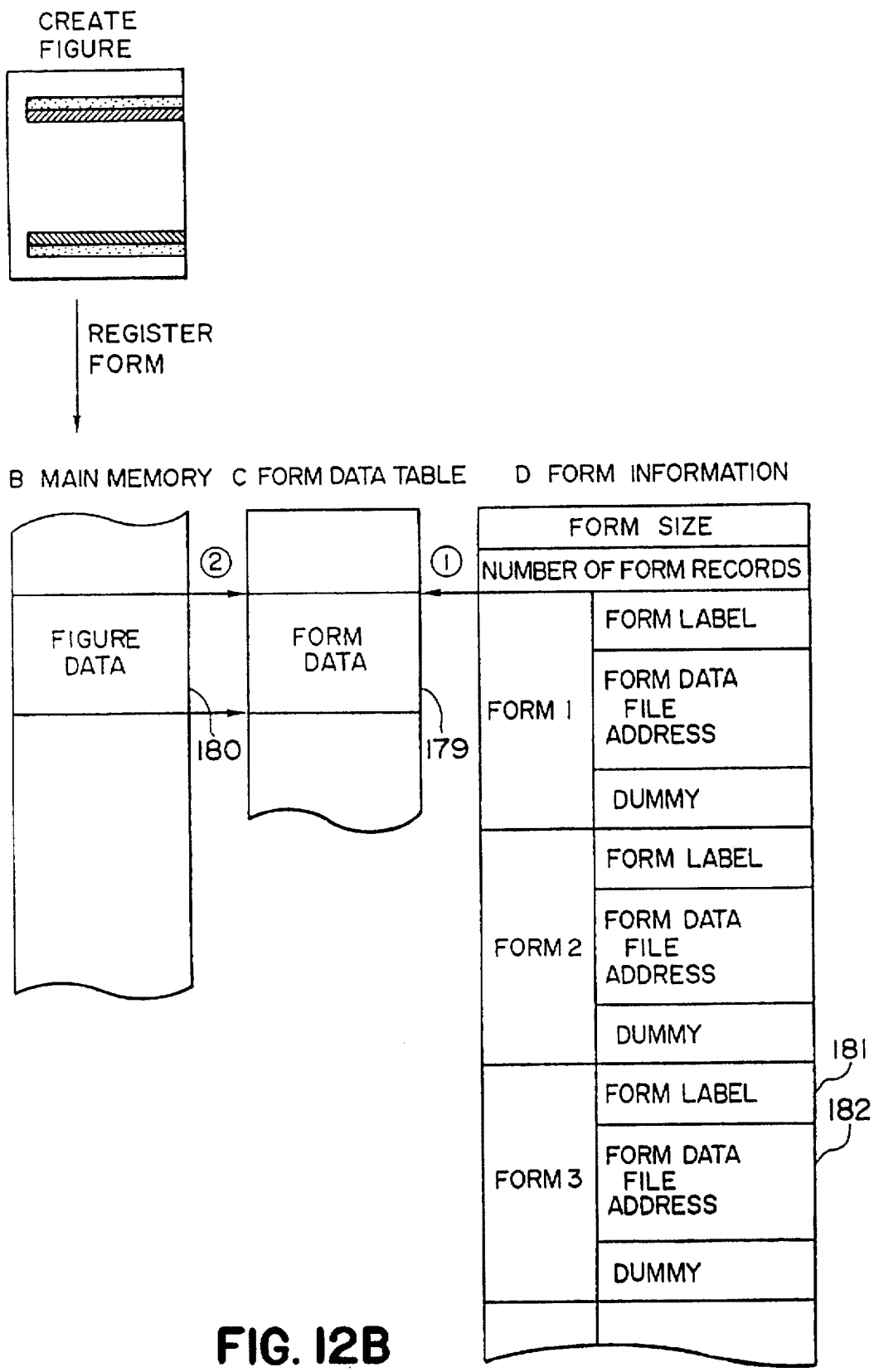

FIGS. 12A and 12B are diagram regarding the form registration according to the invention. FIG. 12A is a flowchart showing the operating procedure until the figure created by the operator is registered as a form and displayed in a document in the form editing. FIG. 12B, shows diagrams B, C, and D showing structures of data which are transmitted and received when a form registration of the figure created by the operator was indicated. (The details will be described hereinlater.)

FORM CONVERSION

Figure 13A:
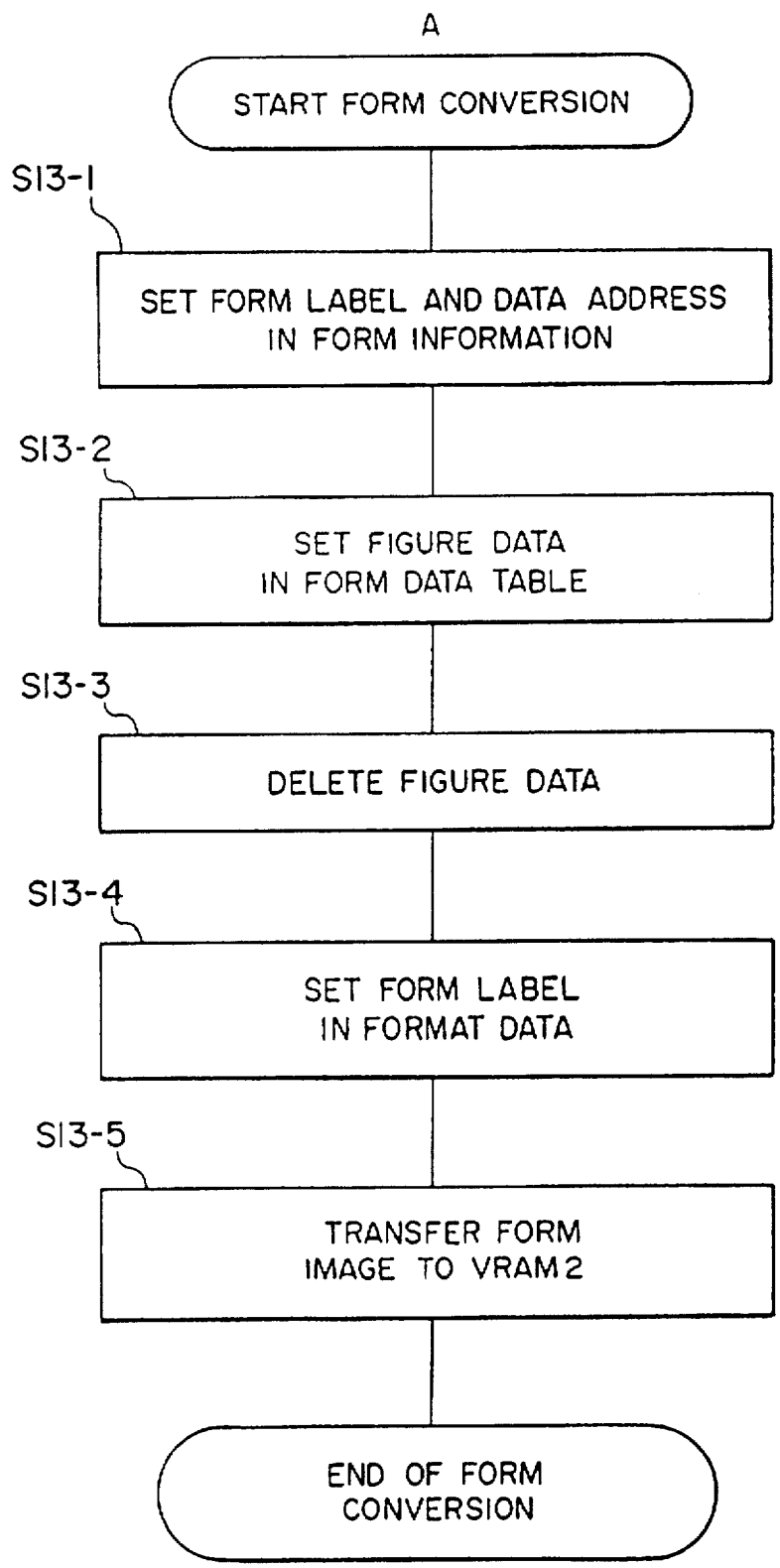
FIGS. 13A and 13B are diagrams regarding the form conversion according to the invention.
Figure 13B:
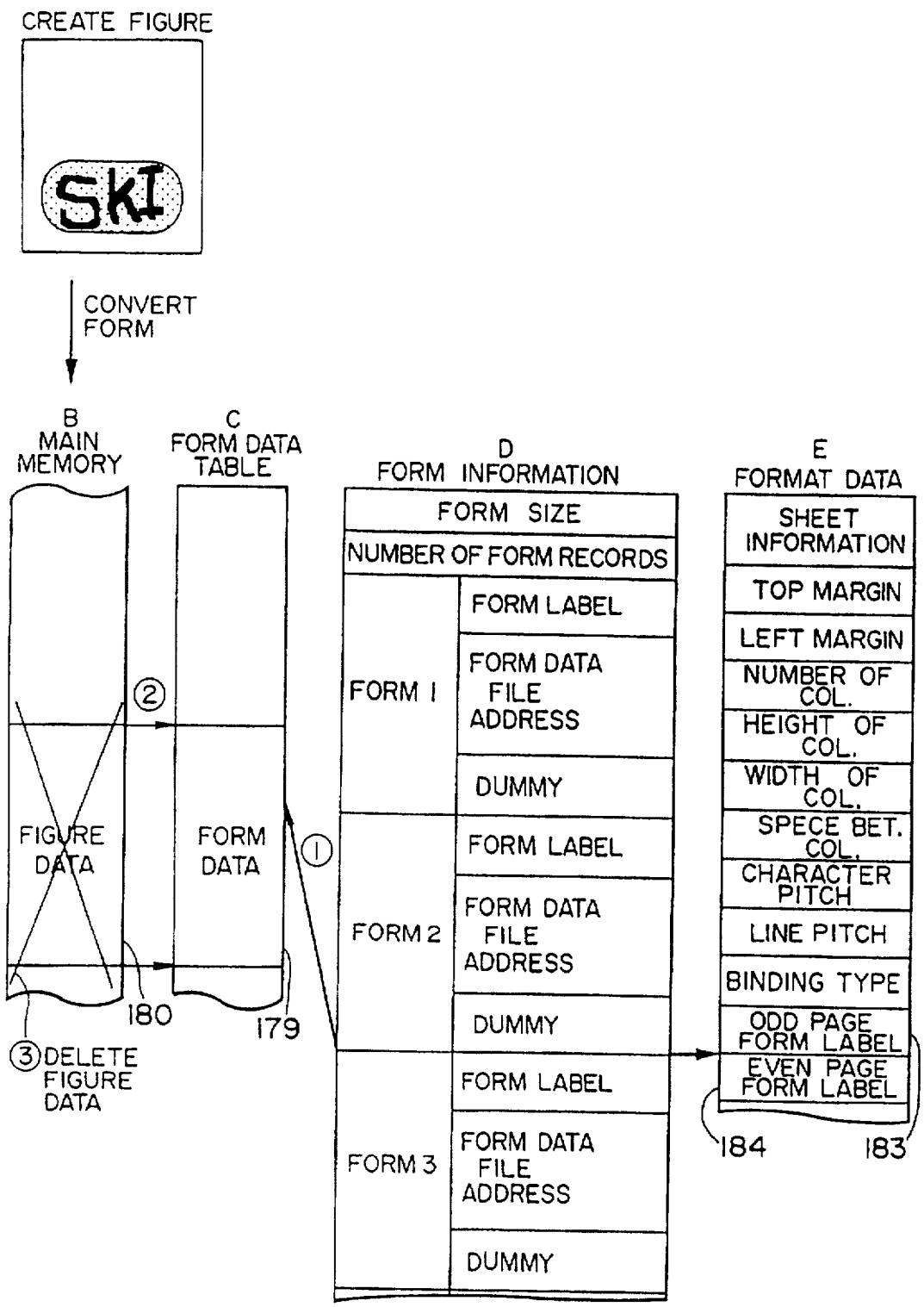

FIG. 13A and 13B are diagrams regarding the form conversion according to the invention. FIG. 13A is a flowchart showing the data processes when the form conversion of the figure created by the operator was indicated. FIG. 13B, shows diagrams B, C, and D showing the data management when the figure created is form converted. (The details will be described hereinlater.)

OUTLINE OF OPERATIONS

The operating procedure when performing the document editing as shown in FIG. 2 will now be described with reference to FIGS. 4 to 6G (hereinafter, FIGS. 6A–6G, are together referred to as FIG. 6). The detailed sequential descriptions about FIG. 4 are omitted and only a few characteristic points will be described.

1) When document editing is newly started, the process in the discriminating step S4-1 is not executed but the character input edit menu and grids are first displayed on the first page of a document.

2) A new page is also created by the character input editing. The selecting step (S4-1) of the input edit mode is always prepared.

3) When the input mode is designated in step S4-1, the menu to be displayed is changed to the menues (25, 26, 27) for input editing to be edited and the display process is then executed.

4) In step S4-2, since the "screen control" command 23 can be indicated irrespective of the input edit type, the display content including the display/non-display of the image other than that input editing is being executed can be checked. Even if the non-display of the image which is being input and edited is indicated, this instruction is ignored.

Figure 8A:
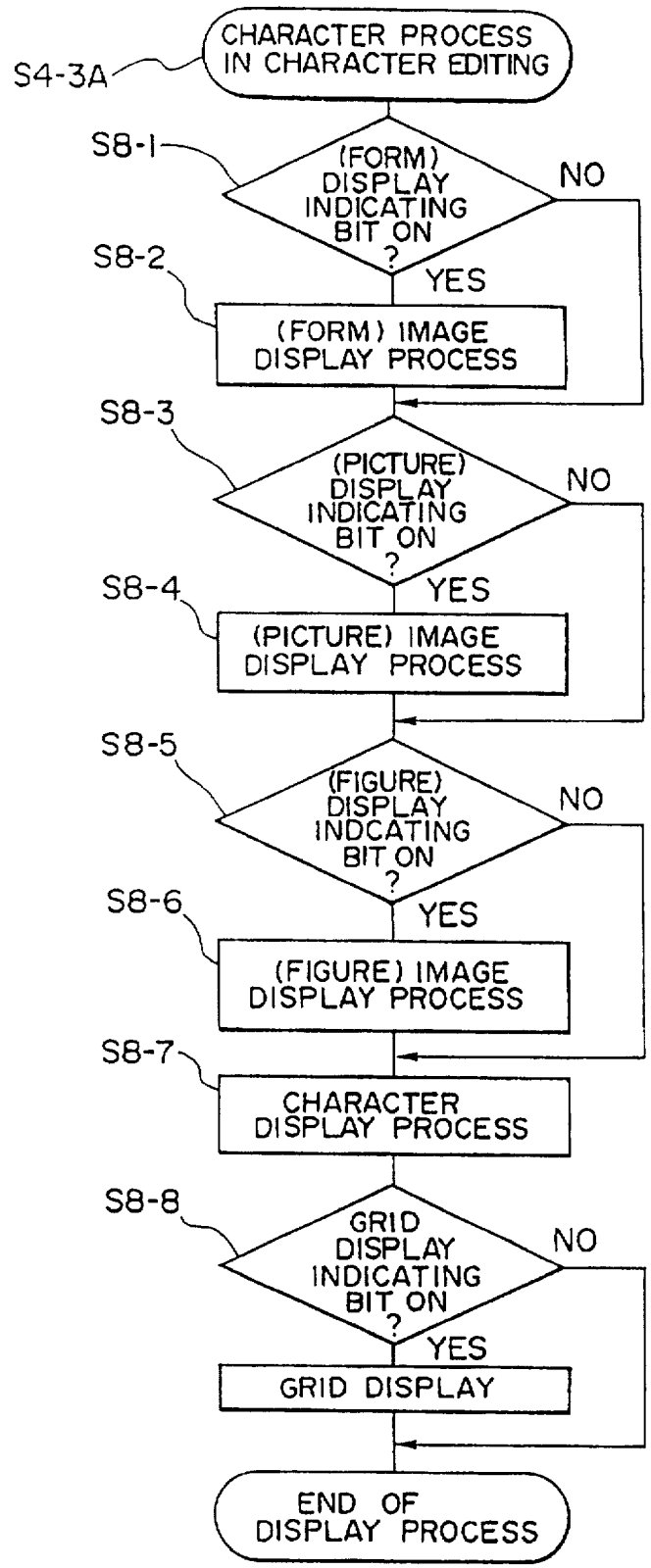
FIGS. 8A to 8D are flowcharts for the internal display processes which are executed when they are instructed by an operator.
Figure 8B:
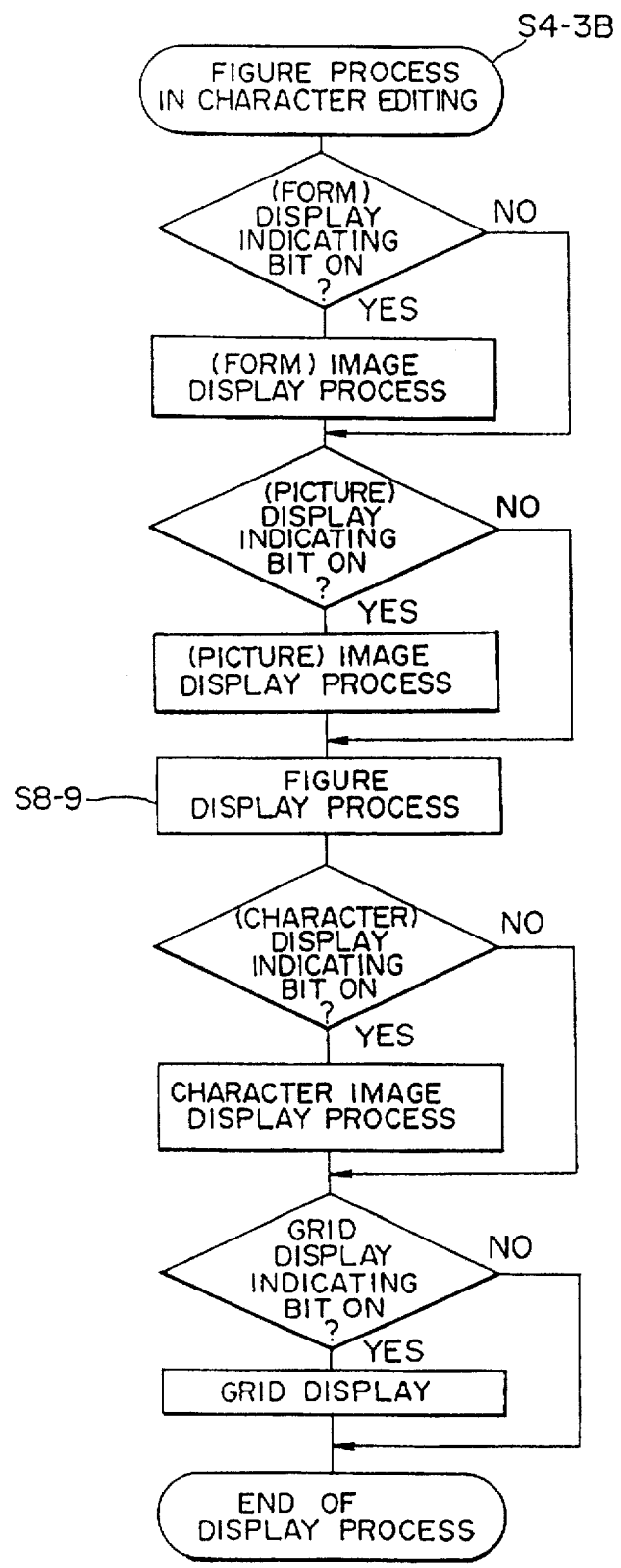
Figure 8C:
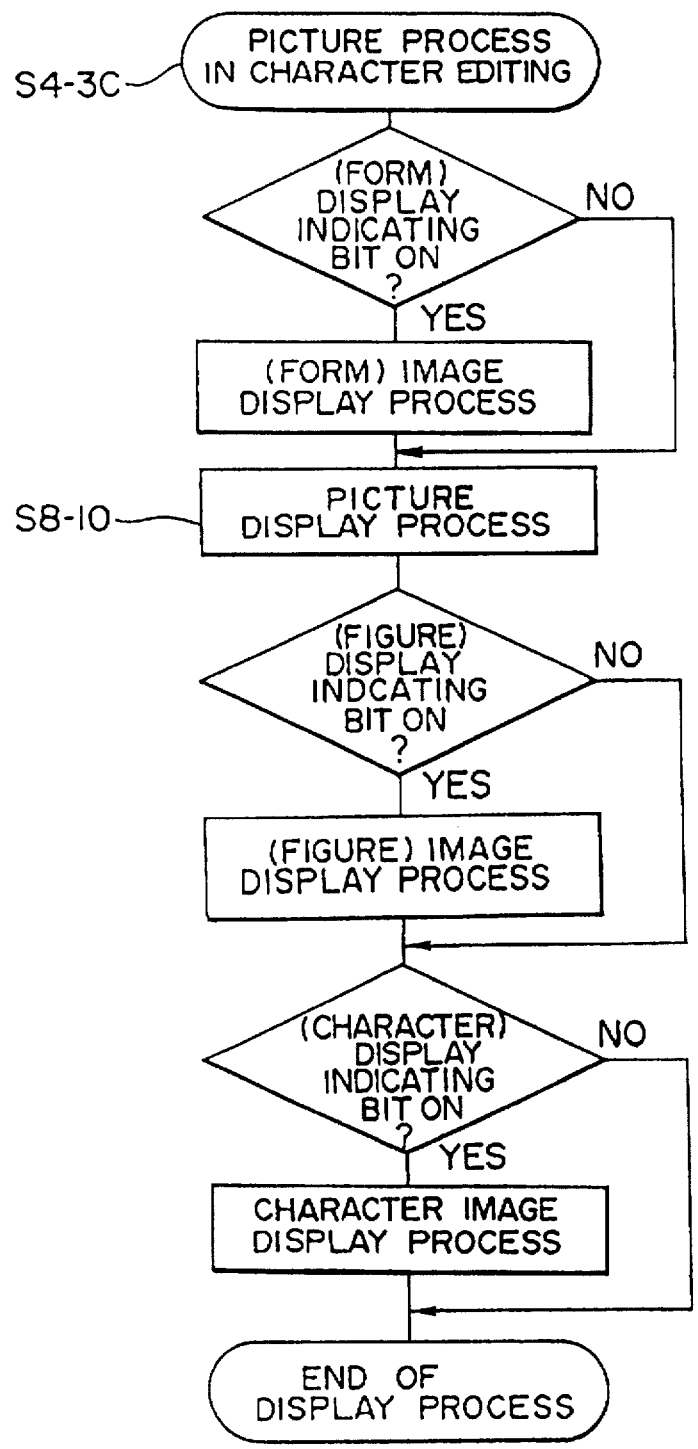

5) The display processes which are executed when the display/non-display of the character image, figure image, picture image, and form image is indicated, when the redisplay is indicated, when the input mode is changed, or the like are shown in FIGS. 8A–8C as the display processes which are executed in steps S4-3A, S4-3B, and S4-3C.

6) It is assumed that all of the areas in which the images are complexedly displayed exist in one document and the definition (frame formation) of a new area is not executed in this document.

The operating procedure in the case of performing the document editing as shown in FIG. 2 under the foregoing prerequisite will now be described with reference to FIGS. 5A–5C and 6.

First, document editing is newly started and the character input editing to create and edit the character image of the front cover (first page) in FIG. 2 is executed.

Step S5-1 shows that a command 34 to "define format" is designated from the character input main menu 25 and the preset definition of the document format can be changed. The most general values such as size of characters of a text or a heading, type style, size of sheet, sizes of upper, lower, right, and left margins, style when the page number or the edited document is printed, and the like are defined as "regular formats" in the format definition. The term to be changed can be redefined on the basis of the regular formats.

In step S5-2, the term to be changed is redefined by the regular formats as a format of the front cover in FIG. 2. However, since the form image which is displayed as the front cover (first page) in FIG. 2 is not registered yet, the form image 18 to be displayed cannot be designated as the term of format. It is now defined here that no number (page number) is output.

In step S5-3, the character image 15 of the front cover (first page) in FIG. 2 is created and edited on the basis of the document format defined in step S5-2.

After character input editing was finished in this manner, the figure input editing is performed to create the form image which is necessary for the whole document. Returning to step S4-1, when the input mode is indicated to a figure input edit 30, a figure input edit menu and grids 42 in FIG. 3B are displayed.

Step S5-4 shows that the definition of the regular grids 42 of the figure input edit which has independently been defined can be changed.

FIGURE INPUT EDIT GRID DEFINITION (depending upon format)

The regular grids 42 which have been independently defined are redefined depending on the format in order to accurately and easily create the form in accordance with the format which is at present being edited in step S5-5. When "define grids" is instructed from the figure input main menu 26, the sub-menu in another frame for the grid definition as shown in FIG. 6A is displayed on the screen. In this case, since it is desired to create a form by using the print area 64 of the format as a reference, such a parameter is set and the redefinition of the grids is finished. The details in the case where the grid definition is performed depending on the format will be described hereinlater.

Next, a figure image is created and edited in step S5-6. As shown in FIG. 6D, a figure can be created and edited on the basis of the format of the page to be edited in accordance with the grids which were redefined in step S5-5.

FORM REGISTRATION AND FORM CONVERSION

In step S5-7, a check is made to see if the created figure image is registered as a form image or not. The image which will be frequently used as a background of documents can be registered as a form image.

When "register form" 36 is instructed from the figure input main menu 26 in step S5-7, a form label is named to a form to be registered and is registered into a form library in FIG. 6E in step S5-8. In this case, the form label is registered as "text sheet, left page". This form can be again designated later and read out as the form image when the format definition is changed in step S5-2.

Similarly, the creation and editing of a figure image are continued to register a form of the right page in FIG. 2. The form label is registered as "text sheet, right page" into the form library in FIG. 6E. After two forms of the text sheets (the 2nd page to the 7th page) in FIG. 2 were registered, the form image 18 which is used as the front cover (first page) in FIG. 2 is created as a figure image in the page (first page) which is at present being edited. A command 37 for "convert form" is instructed from the figure input main menu 26 and the form label is named as "ski information, front cover" and is registered into the form library in FIG. 6E. Due to this "convert form", a format is designated as a format (background of the document) defined in the page (first page) which is being edited. The created figure image is converted into the form image 18. Since the priority of the form image is lower than that of the picture image on display, when the picture image is read, it is overlaid on the form image. The details of "convert form" will be further described hereinlater.

In this manner, the forms necessary for the whole document are created and registered and, further, the figure image 16 is created by the figure input editing. Next, the picture input edit is executed to edit the picture image 17 which is drawn on the front cover (first page) in FIG. 2. Therefore, returning to step S4-1, when a picture input edit 31 is instructed as the input mode, the picture input edit menu in FIG. 3C is displayed.

With respect to the operation for the picture input edit, a check is first made to see if the picture image is read or not in step S5-9.

In step S5-10, a picture to be read is set to the image scanner and the picture image is read.

In step S5-11, the editing such as for moving the picture image which has already been read or to partially delete it or the like is executed. The editing of the picture image 17 is finished in this manner.

After the creation of a document was newly started, four kinds of images consisting of the character image 15, form image 18, figure image 16, and picture image 17 to the front cover (first page) in FIG. 2 are created and the registration of two form images of the text sheets (the 2nd to 7th pages) (these two form images have already been reduced and registered in form libraries 80 and 81 in FIG. 6E) is completed by the foregoing operations.

Next, returning to step S4-1, when a character input edit 29 is instructed as an input mode, the character input edit menu and grids 40 in FIG. 3A are displayed.

The format definition in step S5-1 in FIG. 5A is redefined and the command 34 to define the format is indicated.

IRREGULAR FORMAT (including form) INSERTION A format is redefined in step S5-2. In this step, after the "irregular format" to be inserted between the front cover (first page) and the back front cover (eighth page) in FIG. 2 was defined through the sub-menu, the insertion of the irregular format is designated. (Thus, the print binding is executed on the basis of the different format from the second page.) When defining an "irregular format", only the formats (form, number of classes, width of class, etc.) different from the format of the first page are redefined. When the form is designated and redefined, the H form library shown in FIG. 6E and the sub-menu of another frame to designate the I form including the printing style are displayed. Therefore, it is indicated that "text sheet, right page" and "text sheet, left page" are selected from 80, 81, and 82 which have already been registered in the H form library and designated as forms in a manner such that "text sheet, right page" is set into a column 90 of an odd page of the text (81 for 92) and "text sheet, left page" is set into a column 93 of an even page (80 for 94). In this case, from among a one-side style 84, a both-side style 85, and a binding style 86 in the sheet type 80, the both-side style 85 is selected. After the other terms were also set as a definition of the irregular format, the insertion of the irregular format is indicated. When the defined irregular format is inserted, the page of the document which is at present being edited is changed to the second page. The details of the insertion of the irregular format will be further described hereinlater.

After that, for the document editing of the text (the 2nd to 7th pages) in FIG. 2, three kinds of character, figure, and picture input edit types are freely indicated on the basis of the irregular format definition defined in step S5-2 and document editing is executed.

EXISTENCE OF FOUR LAYERS

Various kinds of editing can be more easily performed if the images other than the image which is being edited among four kinds of character image, figure image, picture image, and form image are conveniently set to the non-display mode by designating the "screen control" command during the editing. Practical examples in this case are shown in FIGS. 3E and 6G. These diagrams show states of documents in the case where the instruction of the display/non-display of an arbitrary number of images other than the image which is being input and edited is given from the screen control sub-menu 23 during the editing of the second page of the document. FIG. 3E shows a state in which a character non-display 44 and a grid non-display 48 were instructed in the figure input edit 30. Due to this, the input figure can be easily checked.

FIG. 6G shows an example in which both of the picture image and figure image are set to the non-display mode during the character input editing. The command of the character input edit 29 is inverted from white to black. The "control screen" command 32 in the character input main menu 25 is indicated. Therefore, the screen control sub-menu 23 is displayed. Even if the command of the character display 44 is designated, it is ignored because of the input editing image. After the operator has indicated a complex display or non-display the images other than the image which is at present being input and edited, he can check the image which is being input and edited while observing the screen.

On the other hand, in the case where the definition was made depending on the format (step S5-12), the figure input editing grids 42 are displayed on the basis of the defined format in the editing page. FIGS. 6C and 6D show a practical example of a figure which was created by displaying the grids depending upon the format and by making the figure adaptive to them. For the definition of the grids, the origin position of the grids is slightly deviated from the corner of the print area and the grid interval can be set to ½ of the line pitch and character pitch. Therefore, a figure image such as a special symbol or the like which cannot be created as a character image can be created so as to keep a good balance to characters.

After the front cover (first page) and the text (the 2nd to 7th pages) in FIG. 2 were edited in this manner, in order to edit the back front cover (8th page), the processing routine is returned to step S4-1, the character input edit is designated as an input mode, and the processing routine is returned to the initial step by the "reset" command of the format. Thus, the format is returned from the inserted "irregular format" to the page 1 format and the back front cover (the 8th page) can be edited on the basis of the format similar to that of the front cover (first page).

DETAILS OF PROCESSES INTEGRATION OF FOUR LAYERS

An explanation will now be further made with reference to FIGS. 7A, 7A-1, 7A-2, 7B, 7B-1, and 7B-2. FIGS. 7A, 7A-1, and 7A-2 show state in which the document as shown in FIG. 2 was read out of the hard disk unit 6 or floppy disk unit 12 and stored into the main memory 5. The A whole construction comprises a header portion 95, a data portion 96, and the other portions. The header portion 95 is provided to control the whole file to be created and its enlarged diagram is shown as a B header portion. The actual data such as J character data page information, K figure data, and L picture data shown in FIG. 7B are stored into the data portion 96. On the other hand, the flag 100 indicating be-editing, flag 101 indicating be-displaying, D current edit data address, etc. which are most concerned with the invention are stored in a C current edit information in the B header portion. A current edit information flag of F describes the details of the two flags 100 and 101. The details of the D current edit data address will be further described hereinlater.

In the F current edit information flag, flag G indicating be-editing comprises a bit 107 indicating a character input editing, a bit 108 indicating a figure input editing, a bit 109 indicating a picture input editing, and the like. Among these bits, only the bit indicating the current input editing is set to ON and the other two bits are set to OFF. The flag G is changed when the operator indicates the commands of the character input edit 29, figure input edit 30, and picture input edit 31 from the common menu 28 in FIG. 3C in order to change the three kinds of input edit types.

A flag H indicating be-displaying comprises a bit 110 indicating that a character image is being displayed, a bit 111 indicating that a figure image is being displayed, a bit 112 indicating that a picture image is being displayed, a bit 113 indicating that a form image is being displayed, a bit 114 indicating that a grid image is being displayed, etc.. These bits correspond to a character display 44, a figure display 45, a picture display 46, a form display 47, and a grid display 48 in the screen control sub-menu 23 which is displayed after the "screen control" command 32 was indicated from the character input main menu 25, figure input main menu 26, and picture input main menu 27 in FIGS. 3A–3C, respectively. In the example shown in FIG. 3E, the bit 110 indicating that a character image is being displayed is set to OFF since the command of the character display 44 is not inverted from white to black. The bit 111 indicating that a figure image is being displayed is set to ON since the command of the figure display 45 has been inverted from white to black. The bit 112 indicating that a picture image is being displayed is set to ON since the command of the picture display 46 has been inverted from white to black. The bit 113 indicating that a form image is being displayed is set to ON since the command of the form display 47 has been inverted from white to black. The bit 114 indicating that a grid image is being displayed is set to OFF since the command of the grid display 48 is not inverted from white to black. All of these bits are set to ON unless, otherwise, the operator indicates the non-display mode. On the other hand, even after the instruction of the non-display mode was once given and those bits are set to OFF, they can be reset to ON by again indicating the display mode. This is because the operator can designate the display/non-display on the screen of an arbitrary number of images other than the image which is being input and edited. (As the internal process, this means that an arbitrary number of bits of the flag B indicating be-displaying are set to OFF. This process can be performed by the simple operation by the operator.) The image in which the bit of the flag G indicating be-editing is set to ON is at present being input and edited. Therefore, even if the instruction of the non-display is given, it is ignored. (In FIG. 3E, the command of the figure input edit 30 has been inverted from white to black, so that a figure image is being input and edited. Even if the command of the figure display 45 is given, it is ignored.)

The absolute address of the data regarding the area which is at present being edited is set in the current edit data address table of D.

FIGS. 7B, 7B-1, and 7B-2 practically show the content of the addresses which are set into the D current edit data address table in FIGS. 7A, 7A-1, and 7A-2.

In FIGS. 7B, 7B-1, and 7B-2 regular format data of I show the format of the whole document. Sheet information 108 and binding style information (a top margin 109, a left margin 110, the number of classes 111, a height of class 112, a width of class 113, a space between classes, etc.) are classified every several terms and stored. The head address is set to a format data address 102. J character data, K figure data, and L picture data are combined for every data and, further, for every page and are managed. The absolute addresses of the data regarding the area which is currently being edited are set to a page information address 103, a character data address 104, a figure data address 105, and a picture data address 106. Addresses at delimiters of page 2 page information 120, page 2 character data 121, page 2 figure data 123, and page 2 picture data 124 are set since the page which is currently being edited assumes the second page. A character size at the delimiter of that page, a type style, line pitch, a character pitch, a page number, etc. are stored in the page information 120. These data are necessary in the case where an arbitrary page is print bound and displayed without referring to the preceding pages since there is a possibility that those data have been changed from those in the original format by various commands. When an arbitrary page is displayed, the page information and format data are referred to and compared and the print binding operation is executed (the terms existing in the page information are preferentially referred to and the terms which do not exist in the page information are print bound after the format data was referred to). (The details will be described hereinlater.)

As mentioned above, due to the independent data management and, further, the existence of the flag indicating G be-editing and the flag indicating H be-displaying shown in FIGS. 7A, 7A-1, and 7A-2 the images are certainly made independent, and an arbitrary position on a document is designated and character, picture, and figure can be input and edited without newly defining an area.

Figure 8D:
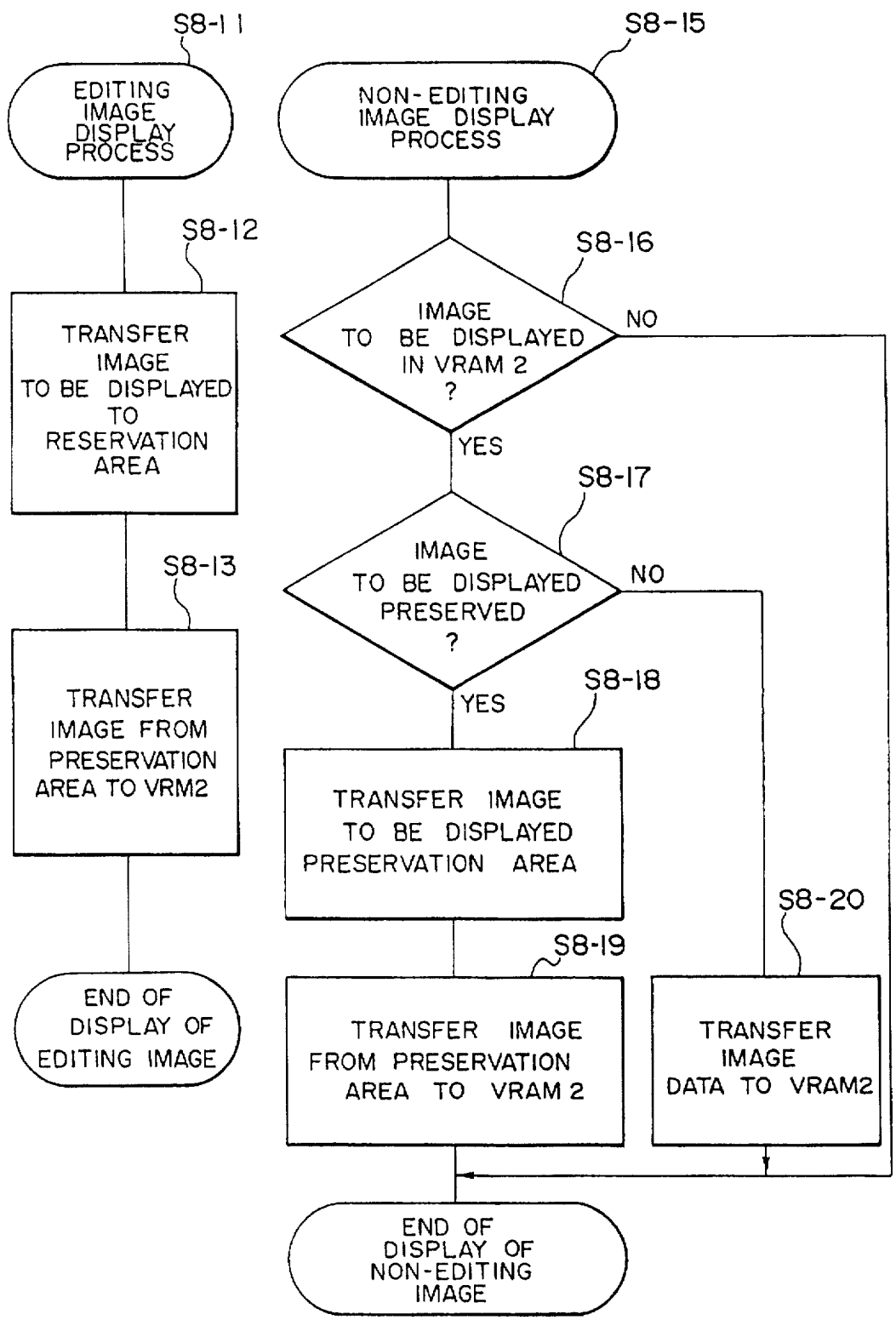

With reference to FIGS. 8A and 8D, an explanation will now be provided with regard to the internal display processes which are executed when 1) an indication of redisplay,
2) an indication of display/non-display of an arbitrary image,
3) an indication of a change in input mode, or the like is given by the operator. When the indication of the display/non-display of an arbitrary image or the indication of the redisplay has been given in steps S4-3A, S4-3B, and S4-3C in FIG. 4 or when the indication to change the input mode has been given in step S4-1, the display processes shown in FIGS. 8A-8C are internally executed. The form image, picture image, figure image, and character image are sequentially displayed in accordance with this order. The internal display processes in this case will now be described.

1) The display order is predetermined irrespective of the input edit type (any of steps S4-3A, S4-3B, and S4-3C) and the form image, picture image, figure image, and character image are sequentially displayed in accordance with the order from the low priority to the high priority images. In a manner similar to the relations among the form image 22, picture image 21, figure image 20, and character image 19 in FIG. 2, they are sequentially overlaid in accordance with the order from the low priority to the high priority images (the character image is displayed on the top since it is displayed finally).

2) Since the image which is being edited is certainly being displayed, it is surely displayed. (The processes in steps S8-7, S8-9, and S8-10 are never skipped.) The discriminating processes in these steps are performed by checking the bit 107 indicating the character input editing, bit cating the figure input editing, and bit 109 ind picture input editing in the flag G indicating be FIGS. 7A, 7A-1, and 7A-2 mentioned above.

3) The images other than the image which is being edited are discriminated by referring to t indicating that a character image is being display indicating that a figure image is being displaye indicating that a picture image is being display indicating that a form image is being displayed, indicating that a grid image is being displayed in indicating be-displaying in FIGS. 7A, 7A-1, (When considering an example of the display p the character input editing, those discriminating are executed in steps S8-1, S8-3, and S8-5.) If ei those bits is set to "1", the image corresponding is displayed.

4) The form image, picture image, and figure sequentially overlaid by the operation of STOF character image is overlaid by the operation of 5) The grids are finally displayed by an EXOF in the case of the display process.

After the independent data management was e mentioned above, the priorities upon display ar thereby enabling four kinds of display patterns pendently managed. The existence of the prioriti the erasure of the characters to be edited by the picture or figure irrespective of the input order or data which is being input. Further, the picture in image, and form image can be arranged while ob state of the print bound document, or they can l setting the character image to the non-display m operability can be improved. On the other hand, example of a display operation has been des similar priorities are also obviously provided wh the edited character image, picture image, figure form image.

Next, the subroutine (the details of the display in FIGS. 8A–8C is divided into the processes fo which is being input and edited in step S8- processes for the images other than the input ed in step S8-15 and an explanation will be made wit to FIG. 8B. In the case of the character edit process in step S4-3A, the input editing ima process in step S8-11 is executed at the time of tl display process in step S8-7. In the case of the fi display process in step S4-3B, the process in st executed at the time of the figure display proc S8-9. In the case of the image editing display pro S4-3C, the process in step S8-11 is executed at the image display process in step S8-10.

First, in step S8-12, only the data of the i developed to the VRAM 2 is transferred and pr the preservation area of the display image.

In step S8-13, the image is developed and di the VRAM 2 on the basis of the created data.

The display process of the non-editing im S8-15 will now be described. The non-input-ed display process in step S8-15 is executed at the form image display process in step S8-2 in the character editing display process in step S4-3/ input-editing image display process is also exe time of the picture image display process in st the figure image display process in step S8-6. Ir the figure editing display process in step S4-3B, in step S8-15 is executed at the time of the in process other than the figure display process (S case of the image editing display process in step S4-3C, the process in step S8-15 is executed at the time of the image display process other than the picture display process (S8-10).

First, a check is made in step S8-16 to see if a display image exists in the VRAM 2 or not. If no image exists, the following processes are not executed.

In step S8-17, a check is made to see if the display image has already been preserved or not. If NO, the processes similar to those in steps S8-12 and S8-13 are performed.

In step S8-18, only the data of the image to be developed in the VRAM 2 is first transferred and preserved into the preservation area of the display image.

In step S8-19, the image is developed and displayed in the VRAM 2 on the basis of the created data.

In step S8-20, if the image has been preserved in step S8-4, this image is transferred to the VRAM 2.

After the image was once preserved, it is displayed, thereby enabling the display process to be promptly executed for preparation of the next display process.

An example of the display process in FIG. 6G will now be practically explained for every step. Since this process relates to the character input editing display process, the bit 113 indicating the form image display in step S8-1 is set to "1" due to the step S4-3A, so that the form image is displayed in step S8-2. Since this process is the non-input-editing image display process, the form image is displayed in step S8-15. Then, step S8-16 and subsequent steps are executed. In the document processing apparatus according to the invention, arbitrary positions on a document are designated and a picture image, a figure image, and a form image can be edited and created at these positions while observing the state of the print bound document without newly defining an area. On the other hand, an arbitrary number of non-editing images can be input in the non-display mode. The display content of the result of the editing can be certainly and promptly checked by the simple operations.

INSERT IRREGULAR FORM AND CHANGE FORM

An explanation will now be made with reference to FIGS. 9A–9D.

After the front cover in FIG. 2-1 was created, the command of the format definition 34 is indicated from the A character input edit menu in FIG. 3D. The command of "insert irregular format" is indicated from the sub-menu displayed after that. Further, the parameter (this corresponds to B or the term of the I regular format data in FIGS. 7B, 7B-1, and 7B-2) in the sub-menu which is branched and displayed is changed by the operator. The data structure during this changing process is shown in FIG. 9A. (This process corresponds to step S5-2 in the flowchart of FIG. 5.) In FIG. 9A-1, A denotes the current edit data address shown in FIG. 7B. B indicates the regular format data shown in FIG. 7B, 7B-1, and 7B-2 and C represents the irregular format data to be inserted (the format is changed on a page unit basis.) These addresses and data are stored in the main memory 5. Data addresses and form labels of E form 1, F form 2, and G form 3 are stored in the D form information. The D form information, E form 1 data table, F form 2 data table, and G form 3 data table are stored in the hard disk unit 6. After the figure data had been created and the command 36 of "register form" was indicated in step S5-8, the figure data is preserved as form data in the hard disk unit 6 and, further, it is set to the D form information. After that, the reduced image is stored in the H form library shown in FIG. 6E. On the other hand, the form 3 set in the B regular format data is displayed as a form image on the front cover in FIG. 2A and this process is performed by the command 37 of "convert form". (The details about the form registration and form conversion will be described hereinlater.)

The same data as the I regular format data in FIG. 7B, 7B-1, and 7B-2 when the front cover in FIG. 2A was print bound is set as a parameter of the C irregular format data before the definition is performed. When the parameter (the value of each term of the format) in the sub-menu to define an irregular format was redefined by the operator, the number of classes 135, a width of class 137, a space between classes 138, an odd page form label 142, an even page form label 143, etc. are replaced to the changed data, respectively. This is because it is sufficient that the operator merely designates only the terms different from the B regular format data. The odd page form label 129 and even page form label 130 are set into the C irregular format data through the H form library and I form designation sub-menu shown in FIG. 6E and 6F which are displayed when the instruction to read out the form was given from the sub-menu to define the irregular format. Actually, when the form labels of forms 1 and 2 are selected from the H form library by the operator and connected to the I form designation sub-menu, the setting to the irregular format data is executed.

The processes when the end of definition is indicated after such an irregular format was actually defined will be sequentially described with reference to FIGS. 9B and 9C. When the instruction to finish the definition of the irregular format to be inserted is given, the following processes are executed.

S9-1 The designated J irregular format data and I regular format data are compared for every term.

S9-2 Only the terms (different from the regular format) changed are added to the page information of the next page.

The reason why the formats of the second and subsequent pages are changed is because of the terms of the format change which are added to the page information of the second and subsequent pages. The processes in this case will be practically described hereinbelow. First, sheet information 131 of the irregular format data J and regular format data I are compared. Since they are the same in this case, no process is executed. With respect to a top margin 132 and a left margin 134, the numbers of classes 135 of the irregular format data J and regular format data I are compared in a manner similar to the above. Since they differ, the number of classes is added to the rear portion of the page 2 page information 145 as shown in the diagram. In this manner, the comparing processes are sequentially executed and the changed terms, the number of classes 135, width of class 137, space between classes 138, odd page form label 142, even page form label 143, etc. are added to the rear portion of the page 2 page information 145. After the page information was created in this manner, when the second and subsequent pages are print bound, the page information is preferentially referred for the terms existing in the page information and the regular format is referred for the terms which do not exist in the page information. Therefore, for the second and subsequent pages, the print binding is executed on the sheet of the A4 size on the basis of the format such that the top margin is 30 mm, the left margin is 10 mm, and the number of classes is two. On the other hand, since every two forms are added to the page information of the second and subsequent pages, when the form image is displayed, the following processes are executed.

1) A form to be displayed is determined depending on whether the display page is the odd page or even page by referring to the page number in the page information. (For example, when the display page is the second page, the page age information is referred. In the page 2 page information, the data indicative of the second page exists.)

2) The form data registered in the D form information is obtained by the form label of the B regular format data in FIG. 9A and FIGS. 9A-1 and 9A-2 (the page 2 page information 145 in the case of the second page in which the format was changed).

3) The form data is created in the preservation area.

4) The form image is developed in the VRAM 2. If the display page is the second page, the "text sheet, left page" in the E form 1 data table is displayed on the screen.

The formats of the second and subsequent pages in FIG. 2A are changed by inserting the irregular format data. Further, after the seventh page was created, when the "reset" command is given, the terms added to the rear portions of the page information of the second and subsequent pages are eliminated from the rear portion of the page 8 page information. Thus, the eighth page is print bound by returning the format to the page 1 format.

In this manner, the format can be changed on a page unit basis when creating the integrated document as shown in FIG. 2A. On the other hand, when two kinds of form images are designated, since they can be designated from the even page, the form images based on the characters, picture, and figure of the editing page can be also designated from any page. Upon printing, it is possible to create a document in which four kinds of images as shown in FIG. 9D are mixed and exist on an image unit and page unit basis. The integrated document can be created by the single printing.

FIGURE INPUT GRID DEFINITION

According to the invention, the figure editing can be performed for a plurality of pages. The data necessary to display grids of each page is set. A measure table of C in FIGS. 10A and 10B is stored and set in the K figure data in FIGS. 7B, 7B-1, and 7B-2 on a page unit basis, so that the grids can be defined and displayed for every page.

Further, since the format data of the editing age can be referred during the figure editing by the invention, the grids can be defined depending on the format.

Therefore, when the figure image 19 and the form image 22 in FIG. 2-3 are created, an explanation will now be provided hereinbelow with reference to FIGS. 10A and 10B with respect to the processes in the case of displaying the grids defined in dependence on the format which could raise the operating efficiency and could accurately easily create the form (figure image during the creating process) 49 according to the current editing format in FIGS. 6A and 6B of an enlarged diagram showing the creating processes of the figure image 19 and form image 22 and the brace (figure image formed by a circular arc 77 and a straight line 78) 79-2 in FIGS. 6C and 6D which is balanced with characters.

In FIGS. 10A and 10B, A denotes a flowchart for the data processes in the case where after the operator had designated the "define grids" command 35 in the menu for figure input edit B in FIGS. 3A–3C, a grid defining method 50 in the sub-menu of another frame for the grid definition of A in FIGS. 6A–6C which is displayed on the screen was indicated so as to be set to "dependent on format" 52. In FIGS. 10A and 10B shows a format data table in which the data to be referred when the grids are displayed depending on the format is set. This format data table is the same as I in FIGS. 7B, 7B-1, and 7B-2. B also shows the details of the measure table in the head portion of the figure data of each page shown at K in FIGS. 7B, 7B-1, and 7B-2.

The display processes of the grids depending on the format shown at A will be first described with respect to the format data L which is referred every S and the measure table C of B.

When the operator indicates that the grid defining method 50 in the sub-menu of another frame of the grid definition A in FIGS. 6A and 6B is set to the "dependent on format" 52, the data necessary to display the grids in the data of the format which is at present being edited is obtained from the format data table B in step S10-1. The necessary data is indicated as hatched regions consisting of a top margin 161, a left margin 162, a character pitch 163, a line pitch 164, 46, and a binding direction 165.

In step S10-2, the data referred from the format data B is set into the measure table C. In the measure table, the operator sets various data in the following manner. The grid defining method 50 in the sub-menu of another frame of the grid definition A in FIGS. 6A and 6B is set to a definition type flag 166. An origin 53 of the grids in the sub-menu of another frame of the grid definition is set to an origin flag 167. An origin position 56 of the grids designated in the sub-menu of another frame of the grid definition is set as coordinates into a grid origin position 168. A grid origin interval 59 designated in the sub-menu of another frame of the grid definition is set to a grid origin interval 171. On the other hand, an indication 62 regarding the grid adaptation in the sub-menu of another frame of the grid definition is set to a grid adaptation flag 174.

The data which is set into the measure table C will be practically explained. In the flag 166 indicative of the grid definition type, a flag bit of "dependent on format" is set to "1" and "dependent on format" is recorded. The origin flag 167 is checked by referring the binding direction of the format data B. If the binding direction 165 is "horizontal", the bit of a flag indicative of "left upper" of the origin position is set to "1" and if it is "vertical", the bit of a flag indicative of "right upper" of the origin position is set to "1". When the operator designates that the origin position 56 of the grids in the sub-menu of another frame of the grid definition A in FIGS. 6A and 6B to "corner of paper" 57 or "corner of print area" 58, the grid origin position 168 is decided by referring to the data of the top margin 161 and left margin 162 of the format data B. The coordinates of the grid origin position, that is, a value in an X direction 169 and a value in a Y direction 170 are set into the measure table. A grid interval 171 is determined by referring to the data of the character pitch 163, line pitch 164, and binding direction 165 of the format data B. When the binding direction 165 is set to "horizontal", the data of the character pitch is referred from the format data B for an X direction 172 in the measure table and the data of the line pitch is likewise referred for a Y direction 173. When the binding direction 165 is set to "vertical", the line pitch is similarly referred for the X direction 172 and the character pitch is likewise referred for the Y direction 173. In this manner, the grid interval is determined and the parameters are set into the measure table. On the other hand, reference numeral 174 denotes the grid adaptation flag. The flag bits are set to "1" in dependence on whether the operator designates that the grids are adaptive or not from the sub-menu of another frame of the grid definition. When the operator designates that the grid adaptation 62 in the sub-menu of another frame of the grid definition A in FIG. 6A and 6B is set to be "adaptive", the creation and editing of the figure are processed so as to be adaptive to the grids (by snapping). Therefore, the figure can be accurately created and edited in accordance with the character size.

From the format data in step S10-2 which is executed when designating that the grid defining method is set to "dependent on format", the setting of the parameter to the grid definition into the measure table C is finished.

When the grid defining method is set to "dependent on format", the grid origin position 168 and grid interval 171 can be further changed. Therefore, in step S10-3, a check is made to see if the parameter set in the measure table B in step S10-2 has been changed or not.

With reference to FIGS. 6A, 6B, and 6D, an explanation will now be provided with respect to that the designation of the grid origin position 56 and the designation of the grid interval 59 can be further changed in the case where the grid defining method 50 in the sub-menu of another frame of the grid definition A in FIGS. 6A and 6B was set to "dependent on format" 52 and the grid origin position was set to "corner of print area" 58. As defined in the sub-menu of another frame of the grid definition A in FIGS. 6A and 6B, the grid origin position 56 is set to "corner of print area" 58 and the grid interval 59 is defined on the basis of a character pitch 60 and a line pitch 61 as references. The grids are displayed on the screen like the document B. FIGS. 6C and 6D show the case where the grid origin position and grid interval were further changed. As defined in the sub-menu of another frame of the grid definition A, the operator can designate the distance from the "corner of print area" corresponding to the grid origin position to the grid origin into 69 by inputting a numerical value. The designation regarding to which parts of fractions of the character pitch and line pitch the grid interval is set can be performed by inputting numerical values to 70 and 71. In FIGS. 6C and 6D, as shown in the document B, a grid origin 74 is shifted from the "corner of print area" 72 and the position of 74 is set to the origin. The grid interval is set to ½ of a character pitch 75 and to ½ of a line pitch 76. In this manner, the grids can be further finely displayed.

When the grid definition has been changed in step S10-3, the necessary data in the format data table B is referred and the grid origin position and grid interval are determined and each parameter is reset to the measure table C in step S10-4.

In step S10-5, the grids are displayed on the screen on the basis of the data which has been defined as mentioned above and set in the measure table C.

FORM REGISTRATION

The processes in the case where the form image 22 in FIG. 2C is created as figure data and registered as a form and displayed on a document will now be described with reference to FIGS. 12A and 12B.

FIG. 12A indicates a flowchart showing the operating procedure when a form is registered and designated and displayed on the screen according to the invention. In FIG. 2B, B, C, and D are diagrams showing the management of data when the operator instructs that a figure created is registered as a form.

The operating procedure A will be described for every step.

The operator starts the document editing. In step S12-1, a form to be registered by the figure input edit is created by a figure. In step S12-2, the "register form" command 36 in the figure input edit menu B in FIGS. 3A–3C which is displayed during the figure editing is designated, so that the "register form" process of data is started. The details will be described on the basis of B, C, and D.

① The data which is displayed as the H form library in FIGS. 6E and 6F on the screen is managed in the form information D. Form labels 181 of the number of forms registered and file addresses 182 of the form data thereof are set in accordance with the registering order of the forms which have been registered or converted (the conversion will be described hereinlater). When a form is newly registered, the form label thereof and the file address of the form data are set to the last portion of the form information.

② Next, figure data 180 which has been stored in the memory B and is registered is set as form data 179 into the form data table C.

After the "register form" process was finished in this manner, in step S12-3, the processing routine advances from the figure input edit to the character input edit. After the character input edit menu A in FIGS. 3A–3C was displayed, the "define format" command 34 is given. The form registered is selected from the H form library and designated into the form designation sub-menu I in FIGS. 6E and 6F which is displayed on the screen. Thus, the data regarding the form which was set by "register form" in step S12-2 and designated to be displayed on the screen is derived from the form information D and form data table C. The form is displayed on the screen and the form display is finished.

FORM CONVERSION

Further, in the invention, even during the figure input editing, the format data of the editing document can be referred or the data can be set to the format data table. Therefore, two kinds of operations to register the form and to display the form onto the screen on the basis of one defined format as mentioned above can be performed by designating one command by the operator. That is, when the form is registered, the form is automatically set to the form label of the format data of the document which is currently being edited. This process assumes the "convert form" process and will be explained hereinbelow with reference to FIGS. 13A and 13B.

After the operator created a figure which will become a form, the "convert form" command 37 in the figure input edit menu B in FIG. 3A–3C is designated, thereby starting the "convert form" process. FIG. 13A, shows a flowchart for the "convert form" processes. In FIG. 13B B, C, D, and E show diagrams of the data management and reception and transmission of data upon "convert form" process. The flowchart of FIG. 13A will now be described hereinbelow every step also with reference to B, C, D, and E. Steps S13-1 to S13-4 in the flowchart correspond to ① to ④ in FIG. 13B. On the other hand, since "convert form" is the process including "register form", the data processes ① and ② in FIG. 12B showing the data transmission and reception upon "register form" have the same processing contents as those of ① and ② in FIG. 13B showing the data transmission and reception upon "convert form". With respect to the B main memory, C form data table, and D form information in FIG. 13B, they are quite the same as those in B, C, and D in FIG. 12B and their detailed descriptions are omitted here.

When the operator instructs "convert form", the following processes are executed.

① The form converted form label 181 and form data address 182 are set into the last portion of the D form information in step S13-1.

② In step S13-2, the figure data 180 in the memory B is set as the form data 181 into the form data table C.

These processes are the same as those in the form registration.

③ In step S13-3, the figure data 180 displayed on the screen is deleted and displayed on the screen. In this case, the data converted into the form data 179 is displayed.

④ In step S13-4, the form label 181 set in step S13-2 is set into the format data 1 of E as an odd page form label 183 if the current editing page is the odd page and as an even page form label 184 if it is an even page. The format data E is derived from the format data address 102 in the current edit data addresses D in the current edit information C shown in FIGS. 7A, 7A-1, and 7A-2.

The form image of the form whose display was automatically designated by the format definition by the foregoing processes is transferred to the VRAM 2 and displayed on the screen in step S13-5. The "convert form" process is finished.

The diagram created without executing the double operations to register and designate is directly form converted and the converted form is displayed on the screen as the definition of the current editing format. Therefore, the operator designates the "convert form" command 37 in the figure character input edit menu B in FIGS. 3A–3C during the figure input editing. After completion of the form conversion, the "character input edit" command 29 is input. The "define format" command 34 in the character input edit menu A in FIGS. 3A–3C displayed is designated. Thereafter, the form designation sub-menu I in FIGS. 6E and 6F is displayed on the screen. Thus, it is possible to confirm that the form label which was form converted to a form label 90 has been set. On the other hand, the style when printing depending on the format definition is designated to the both-side style or binding style and the forms which are displayed and printed are individually designated with respect to the right and left pages. If there is an indication from the operator, the form converted form corresponding to the odd or even editing page is designated as the form display during the format definition.

Due to these processes, the figure based on the format can be directly promptly converted into the form image in the current editing document area without defining a new area.

While observing the state of the document which was print bound as mentioned above, an arbitrary position on the document can be designated and input editing of the form, picture, and figure images according to the format of the editing page can be accurately and promptly performed without newly defining an area. The result of the editing can be also soon redisplayed. On the other hand, the flags indicative of the display/non-display are provided so as to be easily input, respectively. The operating efficiency is improved from the viewpoints of the redisplay and confirmation during the input editing. Due to the independent data management on a page unit and image unit basis, complicated manual efforts to cut and adhere figures after the printing can be eliminated upon creation of an integrated document. Particularly, the case where the areas on the document are not divided has been described here. However, even in the case where the areas on the document are divided by fixed blocks, floating blocks, or the like, the areas which do not belong to the blocks can be processed in accordance with the embodiment. With regard to the areas in the blocks, by independently managing each data for every block, the input editing of pictures and figures can be performed in the same area while observing the print bound state by the similar processes.

ADVANTAGEOUS EFFECTS

As described in detail above, according to the invention, it is possible to provide a document processing apparatus which can input and edit a figure, a picture, and a form at arbitrary positions on a document while observing the state of the print bound document without newly designating an area.

Further, it is also possible to privide a document processing apparatus in which by providing the priorities upon display, an arrangement state with other images can be checked irrespective of the inputting order and the type of inputting image.

Further, it is also possible to provide a document processing apparatus in which since the foregoing data can be mutually independently managed, even in the case where only certain data is set to the non-display mode or those data which are mixed and complicated, they can be displayed at a high speed.

As described in detail above, according to the invention, it is possible to provide a document processing apparatus in which the format can be changed on a page unit basis and one integrated document consisting of a plurality of pages can be output by a single output instruction.

As described in detail above, according to the invention, it is possible to provide a document processing apparatus in which a figure can be input and edited to an arbitrary position while observing the state of a print bound document without newly designating an area (frame), and in order to make it easy to match with the document state, the size information as reference marks for a figure input can be displayed in accordance with the format.

As described in detail above, according to the invention, it is possible to provide a document processing apparatus in which a figure can be input even during the character input editing and this figure can be registered as a form so as to be displayed on a plurality of desired pages.

On the other hand, it is also possible to provide a document processing apparatus having a plurality of form images, in which with a change in format on a page unit basis, a form image can be also changed on a page unit basis, and an integrated document of a plurality of pages consisting of characters, pictures, figures, and forms can be output by a single output instruction.

As described above, according to the invention, since characters and figures can be created and edited in the same area, even during the character input editing, the operating mode can be set to the figure input editing and a figure can be created. Therefore, the form creating operation becomes fairly easy as compared with the complicated operations such as to define another area to create a form. The form created by the form conversion does not need to be redesignated by the format. Consequently, after the form was registered, when the operator wants to display it or the like, the operating mode is not set to the character editing but the registered form is directly defined as a format of the current editing document. Thus, the operating efficiency is largely improved.

On the other hand, as mentioned above, the print style can be set to the both-side style and binding style in which the forms to be displayed are individually set for the right and left pages. Therefore, by defining the formats as mentioned above, the form is automatically designated as a format definition in correspondence to the odd or even page of the form coverted page. The function when creating the integrated document is remarkably improved.

According to the invention, characters and figures can be created and edited in the same area. In this manner, the grids which are displayed during figure editing are defined in dependence on the format of the editing document. Thus, when editing the document, the figure including the form based on the format can be created and edited. On the other hand, the measure table C shown in FIGS. 10A and 10B is created and recorded in the head portion of the figure data of each of the figure data K in FIGS. 7B, 7B-1, and 7B-2, so that the grid definition can be changed for every page. Therefore, during the creation of the document of a plurality of pages, if there exists a page in which only figures are edited, the grid defining method 50 in the sub-menu of another frame of the grid definition A in FIGS. 6A and 6B is set to "independent definition" 51 in which the definition of the figure input editing grids of the page is independently defined irrespective of the format. The figure is displayed and created and edited. On the other hand, if the format of the editing page is changed or "insertion" of the irregular format is instructed, when the grid definition during the figure input editing is set to "dependent on format", the grids can be displayed on the basis of the changed format. The integrated document creating function is improved. The operating efficiency is improved.

As described in detail above, according to the invention, it is possible to provide a document processing apparatus in which a figure, a picture, and a form can be input and edited to an arbitrary position on a document while observing the state of the print bound document without newly designating an area.

Further, it is also possible to provide a document processing apparatus in which by providing the priorities upon display, the arrangement state with the other images can be checked irrespective of the inputting order and the type of inputting image.

Further, it is also possible to provide a document processing apparatus in which since the foregoing data can be mutually independently managed, even if only a certain data is set to the non-display mode or those data complicatedly mixedly exist, they can be displayed at a high speed.

As explained in detail above, according to the invention, it is possible to provide a document processing apparatus in which the format can be changed on a page unit basis and one integrated document consisting of a plurality of pages can be output by a single output instruction.

As described in detail above, according to the invention, it is possible to provide a document processing apparatus in which a figure can be input and edited to an arbitrary position while observing the state of the print bound document without newly designating an area (frame), and in order to make it easy to match with the state of the document, the size information as reference marks to input a figure can be displayed in accordance with the format.

As described in detail above, according to the invention, it is possible to provide a document processing apparatus in which a figure can be input even during the character input editing and this figure can be registered as a form so as to be displayed on a plurality of desired pages.

It is also possible to provide a document processing apparatus having a plurality of form images, in which with a change in format on a page unit basis, the form image can be also changed on a page unit basis, and an integrated document of a plurality of pages consisting of characters, pictures, figures, and forms can be output by a single output instruction.

As mentioned above, according to the invention, since characters and a figure can be created and edited in the same area, even during the character input editing, the operating mode can be set to the figure input editing and a figure can be created. Therefore, the form creating operation becomes fairly easy as compared with the complicated operations such as to define another area to create a form. The form created by the form conversion does not need to be redesignated by a format. Consequently, after the form is registered, if the operator wants to display it or the like, it is directly defined to the format of the current editing document without setting the operating mode to the character editing. Thus, the operating efficiency is largely improved.

On the other hand, the print style can be set to the both-side style and binding style in which forms to be displayed can be individually set for right and left pages as mentioned above. Therefore, by defining a form as mentioned above in the format definition, the form is automatically designated as a format definition in correspondence to the odd or even page of the form converted page. The integrated document creating function is remarkably improved.

According to the invention, characters and a figure can be created and edited in the same area. By defining the grids which are displayed during figure editing in dependence on the format of the editing document as explained above, when editing the document, a figure including a form according to the format can be created and edited. On the other hand, the measure table C shown in FIGS. 10A and 10B is created and recorded in the head portion of the figure data of each page of the figure data K in FIGS. 7B, 7B-1, and 7B-2, so that the grid definition can be changed every page. Therefore, during the creation of the document of a plurality of pages, if there exists the page in which only figures are edited, the grid defining method 50 in the sub-menu of another frame of the grid definition A in FIGS. 6A and 6B is set to "independent definition" 51 in which the definition of the figure input editing grids of the page is independently defined irrespective of the format. The figure is displayed and created and edited. On the other hand, if the format of the editing page is changed or "insertion" of the irregular format is instructed, when the grid definition during the figure input editing is set to "dependent on format", the grids can be displayed on the basis of the changed format. The integrated document creating function is improved. The operating efficiency is improved.

We claim:

1. A document processing apparatus comprising:

form data memory means for storing form data representing a display pattern in response to an instruction from instruction means for registering generated figure data generated by generating means as a form;

data memory means for storing character data and figure data managed on a page unit basis by managing means based on format information including form designation information which designates the form data stored in said form data memory means;

display control means for controlling a display device to display the character data and the figure data in a format based on the format information and the form data stored in said form data memory means, the form data being determined by the form designation information included in the format information, said display control means controlling the display device to display a common menu for selection of either one of the character data and the figure data;

editing means for editing the character data displayed on the display device in response to selection of one of the instructions included in a character input main menu which is displayed in response to selection of the character data in the common menu; and memory control means for controlling said data memory means to update the stored character data in response to the editing of the character data performed by said editing means.

2. An apparatus according to claim 1, wherein said display control means comprises a memory for storing a computer implemented program therein, wherein said display control means operates in accordance with the computer implemented program.

3. An apparatus according to claim 1, further comprising print control means for controlling the printing of the character data, wherein display of the character data is controlled by said display control means.

4. An apparatus according to claim 1, further comprising a printer engine, said printer engine printing the character data controlled by said display control means.

5. A document processing method using a first memory for storing form data representing a display pattern in response to an instruction from instruction means for registering generated figure data generated by generating means as a form, and a second memory for storing character data and the figure data managed on a page unit basis by managing means based on format information including form designation information which designates the form data stored in the first memory, said method comprising the steps of:

controlling a display device to display the character data and the figure data in a format based on the format information and the form data stored in the first memory, the form data being determined by the form designation information included in the format information, and controlling the display device to display a common menu for selection of either one of the character data and the figure data;

editing the character data displayed on the display device in response to selection of one of the instructions included in a character input main menu which is displayed in the event the character data in the common menu is selected; and controlling the second memory to update the stored character data in response to said editing step editing the character data.

6. A method according to claim 5, further comprising the step of storing a computer implemented program, wherein said two controlling steps operate in accordance with the computer implemented program.

7. A method according to claim 5, further comprising the step of controlling the printing of the character data.

8. A method according to claim 5, further comprising the step of printing the character data controlled by said display device controlling step.

* * * * *

UNITED STATES PATENT AND TRADEMARK OFFICE
CERTIFICATE OF CORRECTION

PATENT NO.    : 5,752,053
DATED         : May 12, 1998
INVENTOR(S)   : Hiroshi Takakura et al.

It is certified that error appears in the above-identified patent and that said Letters Patent is hereby corrected as shown below:

Title page
Item [56], References Cited, U.S. PATENT DOCUMENTS:

"4,555,773      11/1985      Karnes, Jr. et al.      395/147"
should read -- 4,555,773 11/1988   Karnes, Jr. et al.  395/147 --

*Assistant Examiner*
"Field" should read -- Feild --.

Item [57], ABSTRACT,
Line 3, "includes" should read -- includes: --.
Line 19, "mixedly" should be deleted.

Drawings,
Figure 5B, Sheet 10, "FIGTURE" should read -- FIGURE --.
Figure 7A-1, Sheet 16, "CRRENT" should read -- CURRENT --.
Figure 7B-2, Sheet 19, "MESURE" should read -- MEASURE --.
Fig. 8A, Sheet 20, "INDCATING" should read -- INDICATING --.
Figure 8C, Sheet 22, "INDCATING" should read -- INDICATING --.
Figure 9A-1, Sheet 24, in box 127, "SPECE" should read -- SPACE --.
Figure 10A, Sheet 29, "DEFINITON" should read -- DEFINITION --.
Figure 10B, Sheet 30, "DIFINITION" should read -- DEFINITION --.
Figure 13B, Sheet 35, "SPECE" should read -- SPACE --

Column 1,
Line 32, "formed." should read -- been formed. --; "of"
should be deleted.
Line 36, "of" should be deleted.
Line 41, "that" should be deleted.
Line 57, "is played" should read -- displayed --.

Column 3,
Line 24, "2-L" should read -- 2C -- and "examples" should read -- examples of --.
Line 26, "shows" should read -- show --.
Line 35, "and" should read -- to --.
Line 60, "C" should read -- 9C --.

UNITED STATES PATENT AND TRADEMARK OFFICE
CERTIFICATE OF CORRECTION

PATENT NO.    : 5,752,053
DATED         : May 12, 1998
INVENTOR(S)   : Hiroshi Takakura et al.

It is certified that error appears in the above-identified patent and that said Letters Patent is hereby corrected as shown below:

Column 4,
Line 22, "the" should be deleted.
Line 24, "total four" should read -- total of four --.
Line 35, "to a" should read -- to --.
Line 36, "explained; and that" should read -- explained that --.
Line 44, "one" should read -- , one --.
Line 67, "picture" should read -- a picture --.

Column 5,
Line 5, "FIG. 2A-2C show" should read -- FIG. 2 (Figs. 2A, 2B, and 2C will be together referred to as FIG. 2 hereinbelow) shows --.
Line 8, "back front cover" should read -- back cover --.
Line 28, "diagram" should read -- diagrams --.
Line 33, "the" should be deleted.

Column 6,
Line 7, "edition." should read -- editing. --.
Line 13, "FIG." should read -- FIGS. --.
Line 17, "FIG." should read -- FIGS. --.
Line 18, "showing" should read -- are diagrams showing --.
Line 28, "FIG." should read -- FIGS. --.
Line 58, "7B-2" should read -- and 7B-2 --.
Line 60, "shows" should read -- show --.
Line 62, "FIG. 2" should read -- FIGS. 2A-2C --.

Column 7,
Line 2, "7-A" should read -- 7A --.
Lines 14 to 19, remove indentations (full margin).
Line 46, "been" should read -- have been --.
Line 52, "In" should be deleted.

Column 8,
Line 3, "diagram" should read -- diagrams --.
Line 7, "12B," should read -- 12B --.
Line 13, "FIG." should read -- FIGS. --
Line 17, "13B," should read -- 13B --.
Line 54, "performing the" should read -- performing --.
Line 58, "and the" should read -- and --.

Column 9,
Line 13, "was" should read -- has been --.

UNITED STATES PATENT AND TRADEMARK OFFICE
CERTIFICATE OF CORRECTION

PATENT NO.    : 5,752,053
DATED         : May 12, 1998
INVENTOR(S)   : Hiroshi Takakura et al.

It is certified that error appears in the above-identified patent and that said Letters Patent is hereby corrected as shown below:

Column 10,
Line 35, "A" should be deleted.
Line 36, "format" should read -- ¶ A format --.
Line 63, "for the" should read -- for --.

Column 11,
Line 25, "indicated a" should read -- indicated to a --.
Line 53, "DETAILS OF PROCESSES" should be centered and "INTEGRATION" should read -- ¶ INTEGRATION --.
Line 57, "shows state" should read -- shows a state --.

Column 12,
Line 21, "etc.." should read -- etc. --
Line 66, "7B-2" should read -- 7B-2, --.

Column 13,
Line 31, "7A-2" should read -- 7A-2, --

Column 14,
Line 43, "8B." should read -- 8D. --.

Column 15,
Line 54, "7B-2" should read -- 7B-2, --.

Column 16,
Line 3, "FIG." should read -- FIGS. --.
Line 16, "FIG." should read -- FIGS. --.

Column 17,
Line 30, "the" (second occurrence) should be deleted.
Line 36, "age" should read -- page --.
Line 37, "the" (first occurrence) should be deleted.
Line 58, "10B shows" should read -- 10B, 10B shows --.

Column 18,
Line 58, "FIG." should read -- FIGS. --

Column 19,
Line 3, "6B, and" should read -- 6B, 6C, and --.
Line 44, "2B," should read -- 12B, --.

UNITED STATES PATENT AND TRADEMARK OFFICE
CERTIFICATE OF CORRECTION

PATENT NO.   : 5,752,053
DATED        : May 12, 1998
INVENTOR(S)  : Hiroshi Takakura et al.

It is certified that error appears in the above-identified patent and that said Letters Patent is hereby corrected as shown below:

Column 20,
Line 29, "13A," should read -- 13A --.
Line 30, "13B" should read -- 13B, --.

Column 21,
Line 55, "privide" should read -- provide --.

Column 23,
Line 34, "the" should be deleted.
Line 46, "the" should be deleted (first occurrence).
Line 47, "the" should be deleted.

Signed and Sealed this

Thirteenth Day of August, 2002

*Attest:*

JAMES E. ROGAN
*Attesting Officer*   Director of the United States Patent and Trademark Office